United States Patent
Choi et al.

(10) Patent No.: US 11,650,621 B2
(45) Date of Patent: May 16, 2023

(54) CIRCUIT BOARD HAVING SOUND GENERATOR AND DISPLAY DEVICE INCLUDING THE SAME

(71) Applicant: Samsung Display Co., Ltd., Yongin-si (KR)

(72) Inventors: Si Young Choi, Asan-si (KR); Jong Tae Kim, Seoul (KR); Young Sik Kim, Yongin-si (KR); Sang Wook Yoo, Hwaseong-si (KR); Jeong Heon Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 315 days.

(21) Appl. No.: 16/891,026

(22) Filed: Jun. 2, 2020

(65) Prior Publication Data
US 2021/0048842 A1    Feb. 18, 2021

(30) Foreign Application Priority Data

Aug. 16, 2019 (KR) .......................... 10-2019-0100396

(51) Int. Cl.
*G06F 1/16* (2006.01)
*G06F 3/16* (2006.01)
(Continued)

(52) U.S. Cl.
CPC ............ *G06F 1/1605* (2013.01); *G06F 1/189* (2013.01); *G06F 3/16* (2013.01); *G10K 9/122* (2013.01);
(Continued)

(58) Field of Classification Search
CPC .... H04R 2499/15; H04R 7/045; H04R 17/00; H04R 2499/11; H04R 2400/03; H04R 1/2807; G06F 3/016; G06F 1/189; G06F 1/1605; G06F 3/16; G06F 1/1652; G09F 9/301; G10K 9/122
(Continued)

(56) References Cited

U.S. PATENT DOCUMENTS 5,889,871 A * 3/1999 Downs, Jr. ............. H04R 17/00
310/334
7,447,324 B2 * 11/2008 Ogawa .................. B06B 1/0618
381/191
(Continued)

FOREIGN PATENT DOCUMENTS

CN      203057505      * 7/2013
JP      5056038          8/2008
(Continued)

*Primary Examiner* — Norman Yu
(74) *Attorney, Agent, or Firm* — H.C. Park & Associates, PLC

(57) ABSTRACT

According to one aspect of the invention, a circuit board for a display device includes: a first layer; a first lead line disposed on the first layer; and a sound generator disposed on the first layer, and the sound generator including: a first electrode to receive a first driving voltage; a second electrode to receive a second driving voltage; and a second layer disposed between the first electrode and the second electrode to contract or expand according to the first driving voltage and the second driving voltage; and a first solder to electrically communicate the first lead line and the first electrode.

17 Claims, 27 Drawing Sheets

(51) Int. Cl.
*G10K 9/122* (2006.01)
*G06F 1/18* (2006.01)
*H04R 7/04* (2006.01)
*H04R 17/00* (2006.01)

(52) U.S. Cl.
CPC ............ *H04R 7/045* (2013.01); *H04R 17/00* (2013.01); *H04R 2499/15* (2013.01)

(58) Field of Classification Search
USPC ........ 381/152, 388, 191, 173, 333; 345/173, 345/156; 455/566
See application file for complete search history.

(56) References Cited

U.S. PATENT DOCUMENTS

| | | | | |
|---|---|---|---|---|
| 8,306,500 | B2* | 11/2012 | Tho | ................. G06F 1/1626 455/566 |
| 2009/0202083 | A1* | 8/2009 | Kageyama | ............. H04R 19/00 29/25.35 |
| 2014/0334078 | A1* | 11/2014 | Lee | ................. H04M 1/03 361/679.01 |
| 2019/0037164 | A1 | 1/2019 | Kim et al. | |

FOREIGN PATENT DOCUMENTS

| | | |
|---|---|---|
| KR | 10-2012-0095110 | 8/2012 |
| KR | 10-1622632 | 5/2016 |
| KR | 10-1919454 | 11/2018 |

* cited by examiner

510 : 511,512,513,514,515,516,517,518

310 : 310a,310b,310c,310d
510 : 511,512,513,514,515,518,519

310 : 310a,310b,310c,310d
510 : 511,512,513,514,515,518

510_22 : 511_22,5121_22A,5121_22B,5131_22,514_22,515_22,516_22,517_22,519_22
310 : 310a,310b_25,310c_25,310d

CIRCUIT BOARD HAVING SOUND GENERATOR AND DISPLAY DEVICE INCLUDING THE SAME This application claims priority from and the benefit of Korean Patent Application No. 10-2019-0100396, filed on Aug. 16, 2019, which is hereby incorporated by reference for all purposes as if fully set forth herein.

BACKGROUND

Field

Exemplary implementations of the invention relate generally to a display device and, more particularly to a circuit board having a sound generator and a display device including the same.

Discussion of the Background

With the advancement of the information age, demand for display devices for displaying images has increased in various forms. For example, such display devices are applied to various electronic devices such as a smartphone, a digital camera, a notebook computer, a navigation device, and a smart television. A display device may include a display panel for displaying images and a sound generator for providing sounds.

Display devices have been applied to various electronic devices, and there are demands for display devices having various designs. For example, in the case of smartphones, by omitting a speaker for outputting another party's voice in a sound mode, it is possible to reduce the non-display area and have a display device with a larger display area.

The above information disclosed in this Background section is only for understanding of the background of the inventive concepts, and, therefore, it may contain information that does not constitute prior art.

SUMMARY

Display devices constructed according to the principles and exemplary implementations of the invention have a circuit board with a sound generator capable of outputting sounds without being exposed to the outside of the display device.

For example, in some exemplary implementations, the sound generator may be disposed on one surface of a display circuit board. Thus, the sounds may be output by using the display panel as a vibration surface by means of the sound generator that is not exposed to the outside. Therefore, a speaker on the front surface of the display device for outputting sounds may be obviated, and thus the transmission part of the cover window may be widened. Accordingly, it is possible to increase the area where images are displayed by the display panel.

In some exemplary implementations, the sound generator may include external electrodes to which a driving voltage is applied on an external surface of the sound generator and a soldering part may electrically connect an external electrode of the sound generator to the lead lines of the display circuit board. In this case, the sound generator may be formed integrally with the display circuit board while the display circuit board is being manufactured. Accordingly, since the sound generator obviates a process or apparatus required to separately attach the sound generator to the lower surface of the lower panel cover, it is possible to reduce manufacturing costs. Also, there is no need to separately provide a space to which the sound generator is attached in the lower panel cover.

In some exemplary implementations, it is possible to increase the fastening force for attaching the sound generator to lead lines by forming multiple soldering parts. It is also possible to more evenly distribute stress applied to the soldering parts due to external impact.

In some exemplary implementations, a filling layer may be disposed in a space between the sound generator and the circuit board. In this case, vibration of the sound generator may be delivered through the front surface of the filling layer. Therefore, by delivering the vibration of the sound generator to the display circuit board through the filling layer in addition to the soldering parts, it is possible to increase a sound pressure level due to the enlargement of the vibration surface.

Also, by using such a filling layer, it is possible to distribute the stress concentration caused by the soldering parts disposed on the side surface of the sound generator into the filling layer. Accordingly, if the display device is dropped and/or subject to external forces, it is possible to reduce the shock delivered to the sound generator. Further, it is also possible to increase the fastening force between the sound generator and the circuit board.

Additional features of the inventive concepts will be set forth in the description which follows, and in part will be apparent from the description, or may be learned by practice of the inventive concepts.

According to one aspect of the invention, a circuit board for a display device includes: a first layer; a first lead line disposed on the first layer; and a sound generator disposed on the first layer, and the sound generator including: a first electrode to receive a first driving voltage; a second electrode to receive a second driving voltage; and a second layer disposed between the first electrode and the second electrode to contract or expand according to the first driving voltage and the second driving voltage; and a first solder to electrically communicate the first lead line and the first electrode.

A second lead line may be disposed on the first layer and spaced apart from the first lead line; and a second solder may electrically communicate the second lead line and the second electrode.

The first electrode may be disposed on the first lead line, and the second electrode may be disposed on the second lead line.

The first solder may be in contact with the first electrode and the first lead line, and the second solder may be in contact with the second electrode and the second lead line The sound generator may include a piezoelectric element and may be disposed on a portion of the first layer exposed by the first lead line and the second lead line, the first lead line and the first electrode may not overlap each other in the thickness direction of the sound generator, and the second lead line and the second electrode may not overlap each other in the thickness direction of the sound generator.

A filling layer may be disposed between the sound generator and a portion of the first layer may be exposed by the first lead line and the second lead line.

The first solder including a first soldering part may be in contact with the first electrode, the first lead line, and the filling layer, and the second solder including a second soldering part may be in contact with the second electrode, the second lead line, and the filling layer.

The first layer may include a base layer, the second layer may include a vibration layer, and the first electrode may include: a first external electrode disposed at not less than one side surface of the sound generator; and first internal electrodes branched from the first external electrode.

The first solder may be in contact with the first external electrode.

The second electrode may include: a second external electrode disposed on the other side surface opposite to the one side surface of the sound generator; and second internal electrodes branched from the second external electrode.

A second lead line may be disposed on the first layer and may be spaced apart from the first lead line; and a second solder may electrically communicate the second lead line and the second electrode.

The first solder may be electrically communicated with the first external electrode, and the second solder may be electrically communicated with the second external electrode.

The first electrode may include: a first-A external electrode disposed on a first side surface of the sound generator; a first-B external electrode disposed on a second side surface opposite to the first side surface of the sound generator; and first internal electrodes branched from the first-A external electrode and the first-B external electrode.

The second electrode may include: a second external electrode disposed on a third side surface, which may be a surface other than the first side surface and the second side surface of the sound generator; and second internal electrodes may be branched from the second external electrode.

According to another aspect of the invention, a circuit board for a display device includes: a first layer; lead lines disposed on the first layer to expose the first layer; a sound generator disposed on the first layer exposed by the lead lines to vibrate and output sounds according to sound driving voltages; and a second layer disposed between the first layer and the sound generator to transmit vibrations from the sound generator to the first layer.

The first layer may include a base layer and the second layer may include a filling layer containing at least one of an epoxy resin, an ethyl cyanoacrylic acid, a methyl methacrylate, and a trifluoroborane.

The second layer may be coupled with at least one of the lead lines.

The sound generator may include: a first electrode to receive a first one of the sound driving voltages; a second electrode to receive a second one of the sound driving voltages; and a vibration layer including a piezoelectric element disposed between the first electrode and the second electrode to contract and expand according to a first driving voltage and a second driving voltage.

According to another aspect of the invention, a display device includes: a display panel including a display area having pixels and a non-display area disposed near the display area; a circuit board disposed on the non-display area of the display panel; and a sound generator disposed on the circuit board, and including: a base layer; a lead line disposed on the base layer; and a first solder disposed between the lead line and one side surface of the sound generator.

The sound generator may vibrate according to sound driving voltages and may include an electrode to receive one of the sound driving voltages, the electrode may be disposed on one side surface of the sound generator, and the first solder may include a soldering part electrically communicating the lead line and the electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EMBODIMENTS

Figure 1:
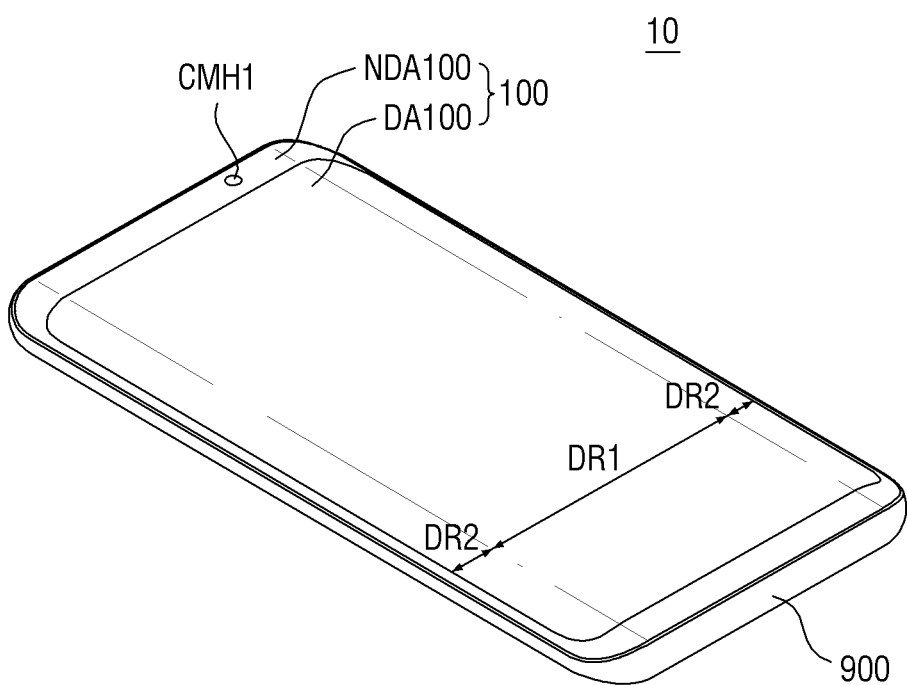
FIG. 1 is a perspective view of an exemplary embodiment of a display device constructed according to principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

As used herein, the term "communicate" means to pass, directly or indirectly, information or energy, such as electricity, from one element to another.

Figure 2:
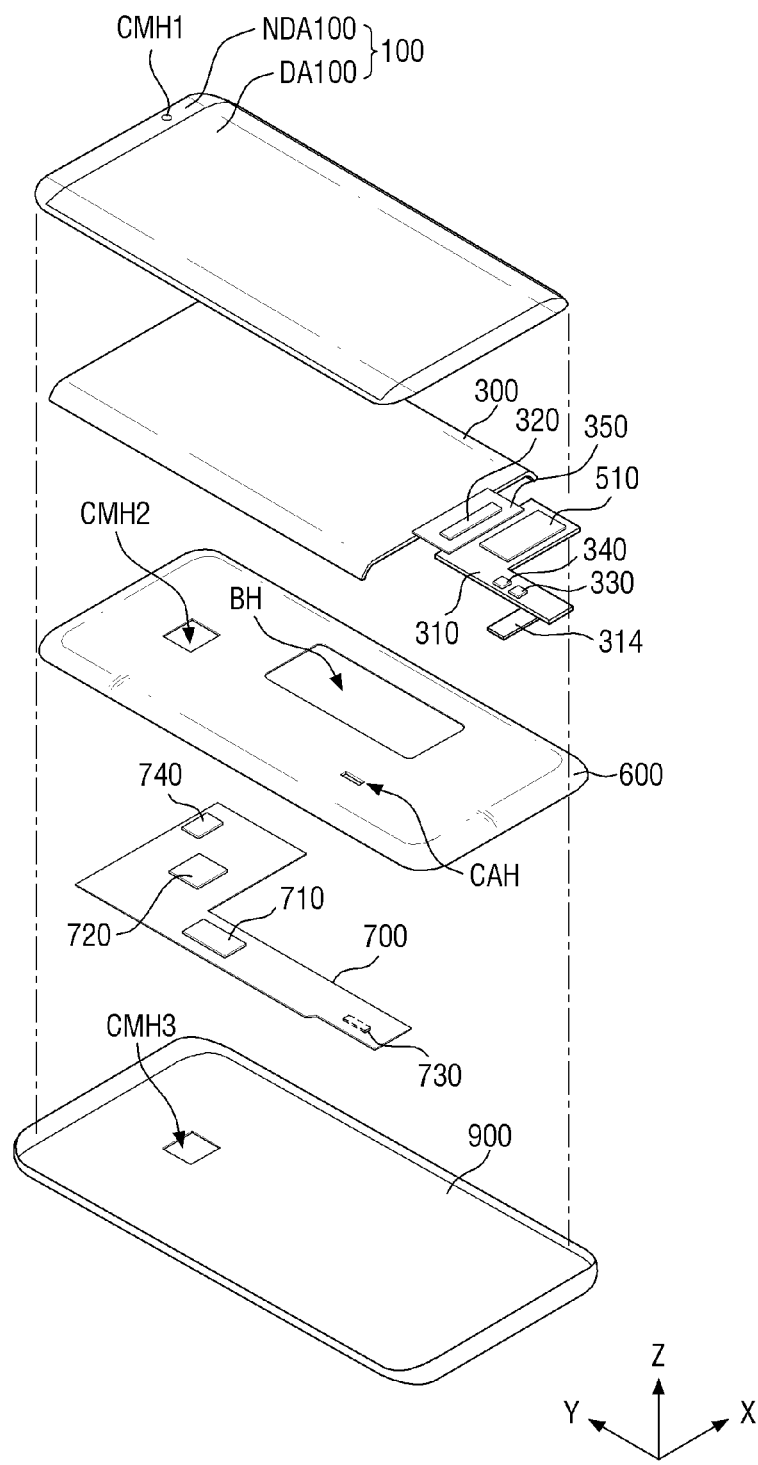
FIG. 2 is an exploded, perspective view of an exemplary embodiment of the display device of FIG. 1.

FIG. 1 is a perspective view of an exemplary embodiment of a display device constructed according to principles of the invention. FIG. 2 is an exploded perspective view of an exemplary embodiment of the display device of FIG. 1.

Referring to FIGS. 1 and 2, a display device 10 includes a cover window 100, a display panel 300, a display circuit board 310, a display driving circuit 320, a flexible film 350, a sound generator 510, a bracket 600, a main circuit board 700, and a lower cover 900.

Here, the term "above," "on top of," or "upper surface" refers to a direction where the cover window 100 is disposed with respect to the display panel 300, that is, the z-axis direction, and the term "below," "on the bottom of," or "lower surface" refers to a direction where the bracket 600 is disposed with respect to the display panel 300, that is, the opposite direction to the Z-axis direction. Also, the terms "left," "right," "upper," and "lower" refer to directions represented when the display device 10 is viewed from the top down. For example, the term "left" refers to the opposite direction to the X-axis direction, the term "right" refers to the X-axis direction, the term "upper" refers to the Y-axis direction, and the term "lower" refers to the opposite direction to the Y-axis direction.

The display device 10 may have a generally rectangular planar shape. For example, the display device 10 may have a planar shape of a rectangle including short sides in the first direction (the X-axis direction) and long sides in the second direction (the Y-axis direction) as shown in FIGS. 1 and 2. Corners at which the short sides in the first direction (the X-axis direction) and the long sides in the second direction (the Y-axis direction) meet may be rounded with a predetermined curvature or formed at a right angle. The planar shape of the display device 10 is not limited to a rectangle and may include a generally polygon shape other than the rectangle, such as a generally circular shape, or a generally elliptical shape.

The display device 10 may include a first area DR1 formed to be substantially flat and a second area DR2 extending from the left and right sides of the first area DR1. The second area DR2 may be formed to be substantially flat or curved. When the second area DR2 is formed to be substantially flat, an angle formed by the first area DR1 and the second area DR2 may be an obtuse angle. When the second area DR2 is formed to be curved, the curve may have a substantially constant or varying curvature.

FIG. 1 illustrates that the second area DR2 extends from both of the left and right sides of the first area DR1, but the exemplary implementations are not limited thereto. That is, the second area DR2 may extend from only one of the left and right sides of the first area DR1. Alternatively, the second area DR2 may extend from at least one of the upper and lower sides from the first area DR1 as well as the left and right sides of the first area DR1. The following description will focus on the second area DR2 being disposed at both the left and right edges of the display device 10. The cover window 100 may be disposed above the display panel 300 to cover the upper surface of the display panel 300. Thus, the cover window 100 may function to protect the upper surface of the display panel 300.

The cover window 100 may include a transmission part DA100 corresponding to the display panel 300 and a light blocking part NDA100 corresponding to an area other than the display panel 300. The cover window 100 may be disposed in the first area DR1 and the second area DR2. The transmission part DA100 may be disposed in a portion of the first area DR1 and a portion of the second areas DR2. The light blocking part NDA100 may be formed to be opaque. Alternatively, the light blocking part NDA100 may be formed as a decor layer where a pattern that can be made visible to a user is formed when no picture is displayed. For example, a company's logo or various characters may be patterned in the light blocking part NDA100. Also, a first camera hole CMH1 for exposing a front camera 740 may be formed in the light blocking part NDA100, but exemplary implementations are not limited thereto. For example, the first camera hole CMH1 may be formed in the transmission part DA100 other than the light blocking part NDA100. In this case, the display panel 300 may include a through-hole for exposing a front camera 740.

The display panel 300 may be disposed below the cover window 100. The display panel 300 may overlap the transmission part DA100 of the cover window 100. The display panel 300 may be disposed in the first area DR1 and the second area DR2. Thus, an image of the display panel 300 may be shown in the second area DR2 as well as in the first area DR1.

The display panel 300 may be a light emitting display panel including a light emitting element. For example, the display panel 300 may include an organic light emitting display panel using an organic light emitting diode including an organic light emitting layer, a micro light emitting diode display panel using a micro light emitting diode, a quantum dot light emitting display panel using a quantum dot light emitting element including a quantum dot light emitting layer, or an inorganic light emitting display panel using an inorganic light emitting element including an inorganic semiconductor. Hereinafter, the display panel 300 will be mainly described as being an organic light emitting display panel for descriptive convenience.

The display circuit board 310 and the display driving circuit 320 may be attached to one side of the display panel 300. One end of the display circuit board 310 may be attached to pads provided at one side of the display panel 300 using an anisotropic conductive film. The display circuit board 310 may be a flexible printed circuit board that is bendable, a rigid printed circuit board that is hard and not bendable, or a hybrid printed circuit board including both of the rigid printed circuit board and the flexible printed circuit board.

The display driving circuit 320 receives control signals and power voltages through the display circuit board 310 and generates and outputs signals and voltages for driving the display panel 300. The display driving circuit 320 may be formed as an integrated circuit and may be attached to the display circuit board 310. Alternatively, the display driving circuit 320 may be attached to the display panel 300 by a chip-on-glass (COG), a chip-on-plastic (COP), or ultrasonic process.

The touch driving circuit 330 may be disposed on the display circuit board 310. The touch driving circuit 330 may be formed as an integrated circuit and attached to the upper surface of the display circuit board 310. The touch driving circuit 330 may be electrically connected to sensor electrodes of a touch sensor layer of the display panel 300 through the display circuit board 310. The touch driving circuit 330 may apply touch driving signals to driving electrodes among the sensor electrodes and then sense, by means of sensing electrodes among the sensor electrodes, the amount of charge change in capacitance between the driving electrodes and the sensing electrodes. The touch driving circuit 330 may determine whether a user's touch or proximity is present according to the sensed amount of charge change. The user's touch indicates that an object such as a user's finger or pen is in direct contact with one surface of the display device 10 disposed on a touch sensing layer (TSL). The user's proximity indicates that an object such as a user's finger or pen is hovering above one surface of the display device 10.

The sound driving circuit 340 may be disposed on the display circuit board 310. The sound driving circuit 340 receives sound data from a main processor 710. The sound driving circuit 340 generates sound driving voltages according to the sound data and outputs the generated sound driving voltages to the sound generator 510. The sound driving voltages may include a first driving voltage and a second driving voltage. The sound generator 510 may contract or expand depending on the first driving voltage and the second driving voltage and may output sounds by vibrating the display panel 300.

The sound driving circuit 340 may include a digital signal processor (DSP) configured to process the sound data, which is a digital signal, a digital-to-analog converter (DAC) configured to convert digital data processed by the digital signal processor into sound driving voltages, each of which is an analog signal, and an amplifier (AMP) configured to amplify and output the sound driving voltages.

A power supply circuit for supplying display driving voltages for driving the display driving circuit 320 may be disposed on the display circuit board 310. In this case, the display driving voltages for driving the display panel 300 and the sound driving voltages for driving the sound generator 510 may be generated and supplied by different circuits. Therefore, it is possible to prevent the display driving voltages for driving the display panel 300 from being affected by the sound driving voltages for driving the sound generator 510.

One side of the flexible film 350 may be attached to the upper surface of the display panel 300 from a lower side of the display panel 300 using an anisotropic conductive film. The other side of the flexible film 350 may be attached to the upper surface of the display circuit board 310 at an upper side of the display circuit board 310 using an anisotropic conductive film. The flexible film 350 may be bendable.

The sound generator 510 may be disposed on one surface of the display circuit board 310. The sound generator 510 may include a piezoelectric element or a piezoelectric actuator for vibrating the display panel 300 using a piezoelectric material that contracts or expands according to an applied voltage. Other known vibration elements may be used to generate sound in the sound generator 510.

The bracket 600 may be disposed under the display panel 300. The bracket 600 may contain at least one of plastic and metal. A second camera hole CMH2 into which a camera device 720 is to be inserted, a battery hole BH where a battery is to be disposed, and a cable hole CAH may allow a bendable connector 314, which may be in the form of a cable, to pass through and connect to the display circuit board 310.

The main circuit board 700 may be disposed below the bracket 600. The main circuit board 700 may be a printed circuit board or a flexible printed circuit board, but the exemplary implementations are not limited thereto.

The main processor 710, the camera device 720, a main connector 730, and a front camera 740 may be disposed on the main circuit board 700. The camera device 720 may be disposed on both of the upper surface and the lower surface of the main circuit board 700.

The main processor 710 may be disposed on the upper surface of the main circuit board 700. The main connector 730 may be disposed on the lower surface of the main circuit board 700. The main processor 710 may control all the functions of the display device 10. For example, the main processor 710 may output digital video data to the display driving circuit 320 through the display circuit board 310 such that the display panel 300 displays images. Also, the main processor 710 may receive sensor data from the touch driving circuit 330, determine whether there is a user's touch or proximity, and execute an operation corresponding to the user's touch input or proximity input. For example, the main processor 710 may execute an application that is indicated by an icon touched by a user. Also, in order to output sounds by vibrating the display panel 300 by means of the sound generator 510, the main processor 710 may output sound data to the sound driving circuit 340 for driving the sound generator 510. The main processor 710 may be an application processor, a central processing unit, or a system chip which is formed as an integrated circuit.

The camera device 720 processes a picture frame such as a still image or a video obtained by an image sensor in a camera mode and outputs the processed picture frame to the main processor 710.

The connector 314 that has passed through the cable hole CAH of the bracket 600 may be connected to the main connector 730. Thus, the main circuit board 700 may be electrically connected to the display circuit board 310.

In addition, the main circuit board 700 may further include a mobile communication module capable of transmitting or receiving radio signals to or from at least one of a base station, an external terminal, and a server over a mobile communication network. The radio signals may include various types of data along with transmission or reception of voice signals, video call signals, or text/multimedia messages.

The lower cover 900 may be disposed below the bracket 600 and the main circuit is board 700. The lower cover 900 may be coupled and fastened to the bracket 600. The lower cover 900 may form a lower external appearance of the display device 10. The lower cover 900 may contain at least one of plastic and metal.

A third camera hole CMH3 through which the lower surface of the camera device 720 is exposed may be formed in the lower cover 900. The location of the camera device 720 and the locations of the second and third camera holes CMH2 and CMH3 corresponding to the camera device 720 are not limited to the embodiment shown in FIG. 2.

Figure 3:
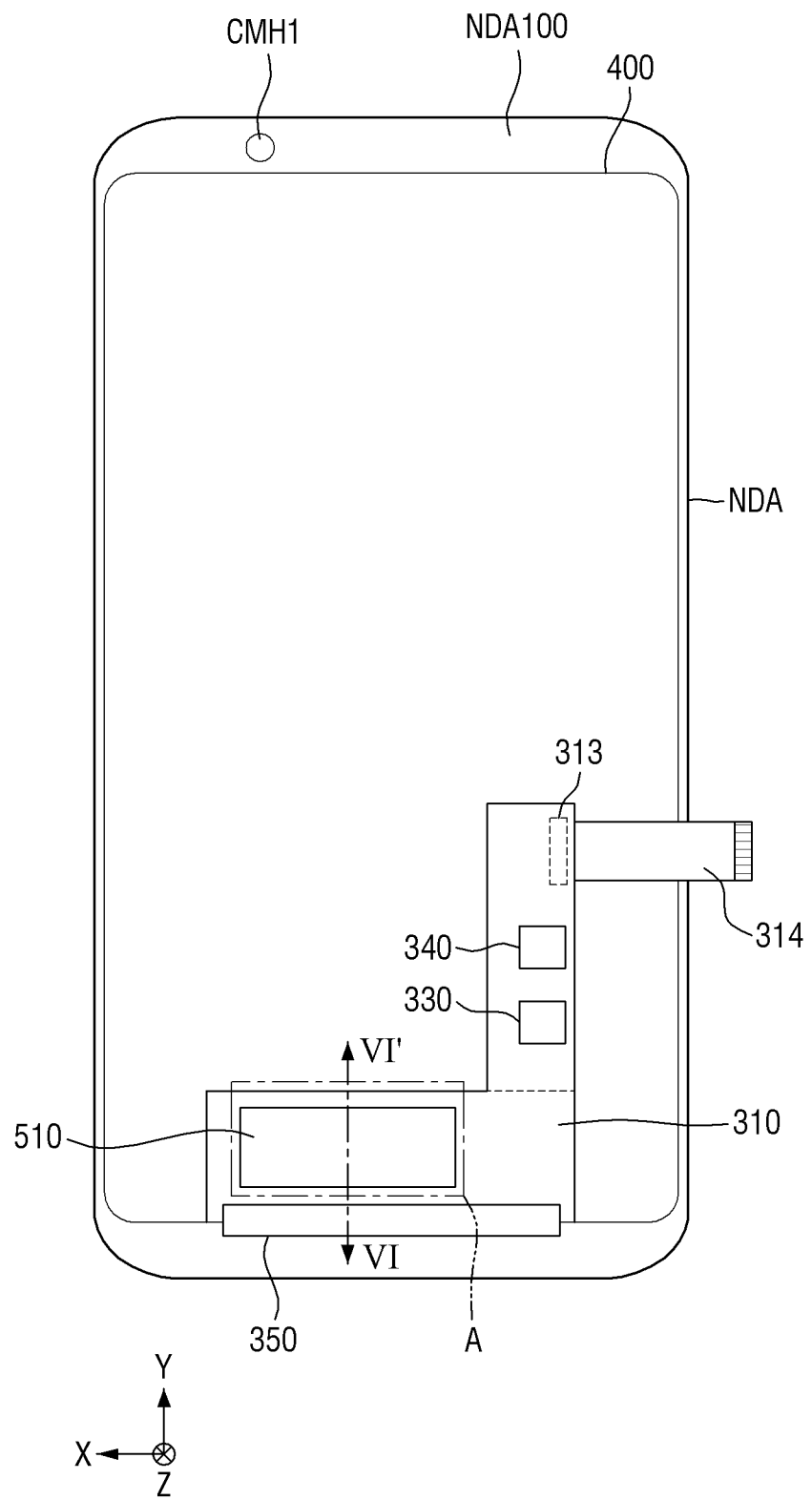
FIG. 3 is a bottom, plan view of an exemplary embodiment of a lower cover panel attached to the display panel of FIG. 1.
Figure 4:
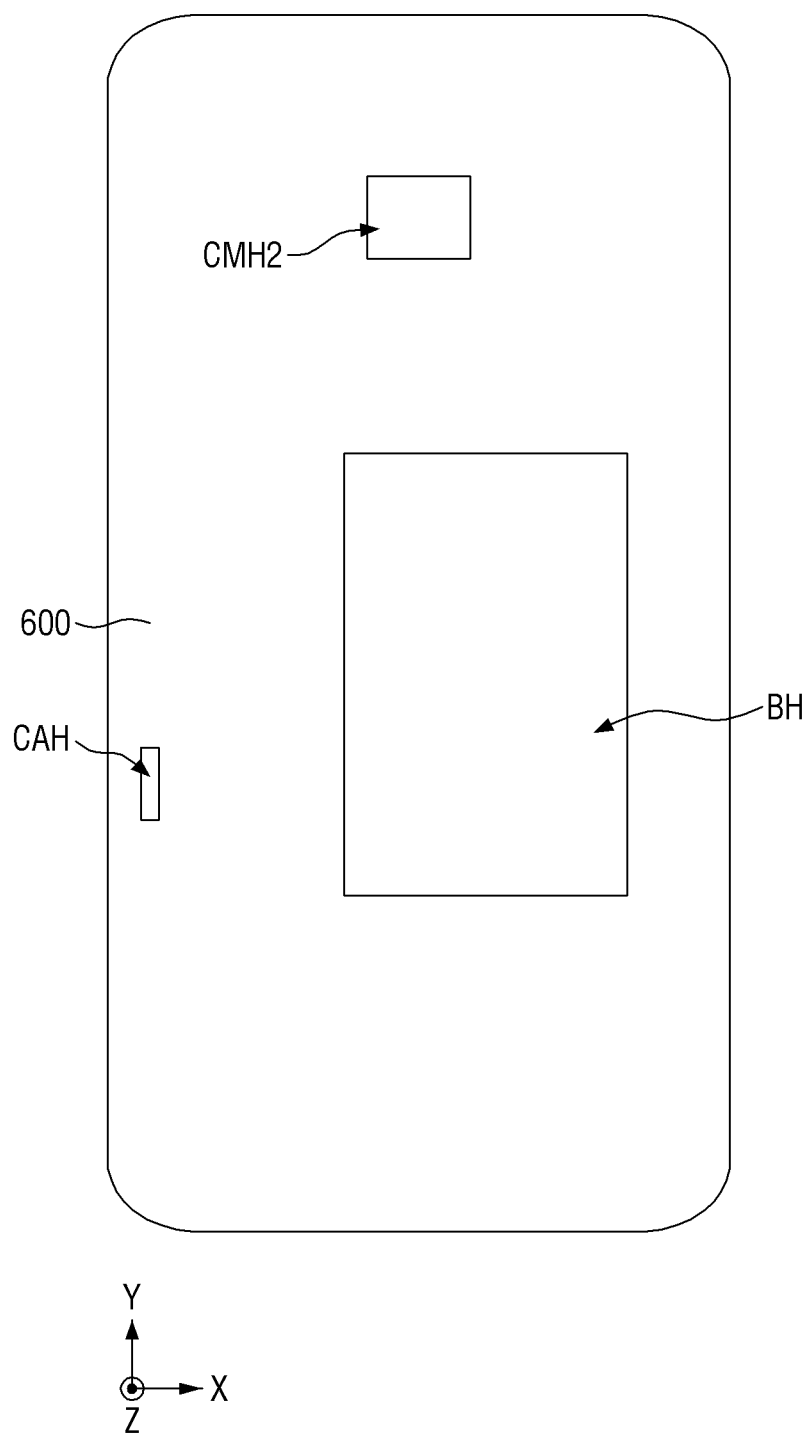
FIG. 4 is a top, plan view of an exemplary embodiment of a bracket of FIG. 1.
Figure 5:
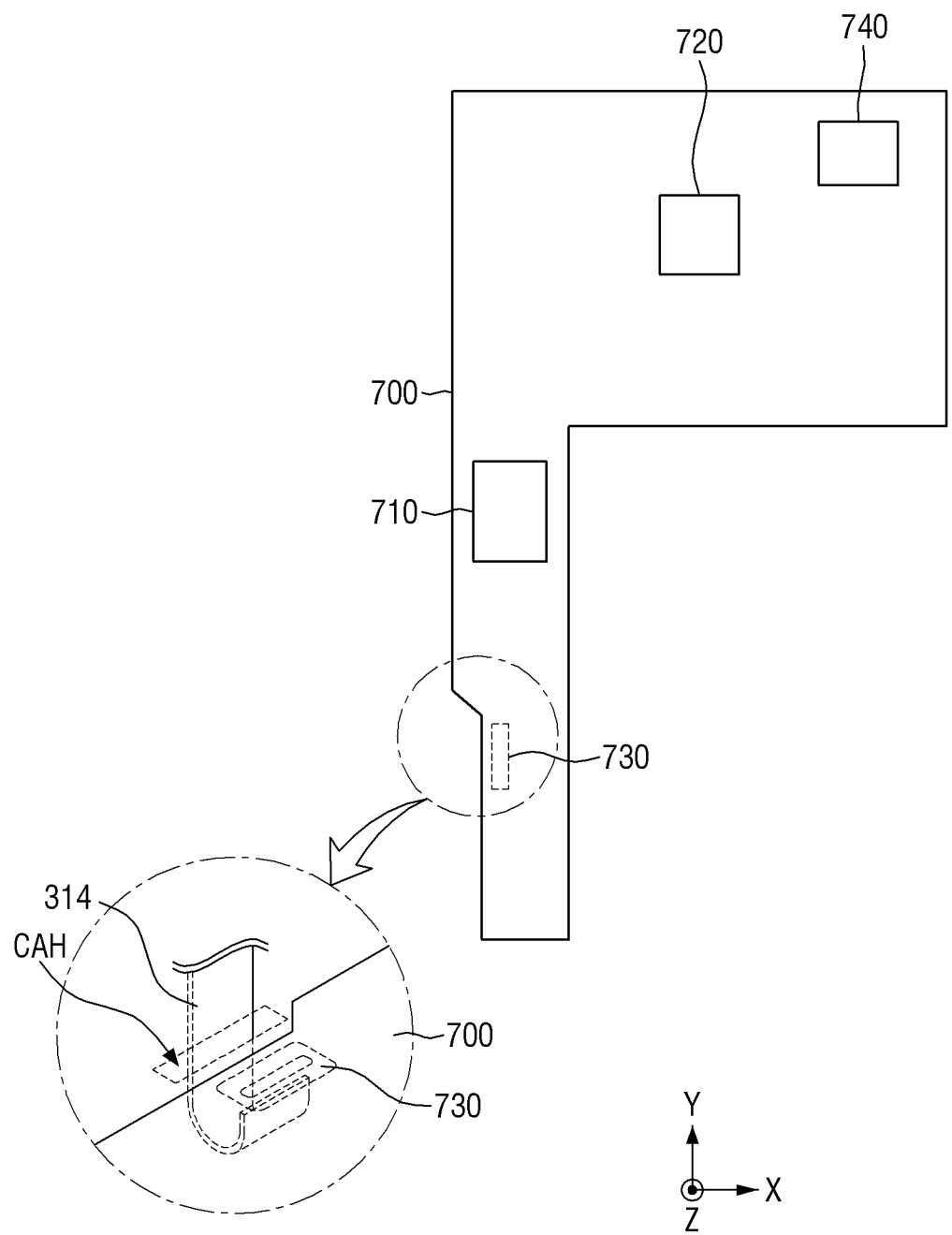
FIG. 5 is a top, plan view of an exemplary embodiment of a main circuit board of FIG. 1.

FIG. 3 is a bottom, plan view of an exemplary embodiment of a lower cover panel attached to the display panel of FIG. 1. FIG. 4 is a top, plan view of an exemplary embodiment of a bracket of FIG. 1. FIG. 5 is a top, plan view of an exemplary embodiment of a main circuit board of FIG. 1.

Referring to FIGS. 3 and 5, a lower panel cover 400 may be disposed below the display panel 300. The lower panel cover 400 may be attached to the lower surface of the display panel 300 through an adhesive member. The adhesive member may be a pressure sensitive adhesive (PSA).

The lower panel cover 400 may include at least one of a light absorbing member for absorbing light incident from the outside, a shock absorbing member for absorbing shock from the outside, and a heat dissipation member for efficiently dissipating heat from the display panel 300.

The light absorbing member may be disposed below the display panel 300. The light absorbing member prevents light transmission to prevent components disposed below the light absorbing member, for example, the display circuit board 310, the sound generator 510, and the like from being viewed from the top of the display panel 300. The light absorbing member may include a light absorbing material such as a black pigment or dye.

The shock absorbing member may be disposed below the light absorbing member. The shock absorbing member absorbs external shock and prevents the display panel 300 from being damaged. The shock absorbing member may be formed in a single layer or in a plurality of layers. For example, the shock absorbing member may be formed of a polymer resin such as polyurethane, polycarbonate, polypropylene, polyethylene, or the like or may contain an elastic material such as a rubber, a urethane-based material, and a sponge formed by foaming an acrylic material. The shock absorbing member may be a cushion layer.

The heat radiation member may be disposed below the shock absorbing member. The heat radiation member may be formed in a single layer or in a plurality of layers. For example, when the heat radiation member is formed in a plurality of layers, the heat radiation member may include a first heat radiation layer containing graphite, carbon nanotubes, and the like and a second heat dissipation layer formed of a metal thin film such as copper, nickel, ferrite, and silver that are excellent in thermal conductivity and that are capable of shielding electromagnetic waves.

The lower panel cover 400 may be omitted. In this case, the components disposed on the lower surface of the lower panel cover 400, for example, the display circuit board 310 may be disposed on the lower surface of the display panel 300 instead of the lower source of the lower panel cover 400.

As shown in FIG. 3, the display circuit board 310 may be bent and disposed below the lower panel cover 400. The display circuit board 310 may be fastened or adhered to the lower surface of the lower panel cover 400 by means of an adhesive member such as a pressure sensitive adhesive (PSA) or a fastening member such as a screw.

The sound generator 510 may be disposed on one surface of the display circuit board 310. The sound generator 510 may be fastened to the display circuit board 310 by means of soldering which will be described below. However, the exemplary implementations are not limited thereto, and the sound generator 510 may be fastened to the display circuit board by means of an anisotropy conductive adhesive member such as an anisotropy conductive film, an anisotropy conductive paste, and an adhesive member such as a pressure sensitive adhesive (PSA). Since the display circuit board 310 to which the sound generator 510 is to be fastened is fastened to the lower panel cover 400, the display panel 300 may be vibrated by the sound generator 510 in the thickness direction (the Z-axis direction).

The touch driving circuit 330 and the sound driving circuit 340 may be disposed on one surface of the display circuit board 310, and the first connector 313 is disposed on the other surface. The first connector 313 may include an insertion part connected to a first connection part of the connector 314.

The first connection part disposed on one end of the connector 314 may be inserted into the insertion part of the first connector 313. As shown in FIGS. 4 and 5, the second connection part disposed on the other end of the connector 314 may be bent downward from the main circuit board 700 through the cable hole CAH passing through the bracket 600 and may be inserted into an insertion part of the main connector 730.

According to the embodiment shown in FIGS. 3 to 5, a sound generator 510 that vibrates the display panel 300 is disposed on one surface of the display circuit board 310 to output sounds. Thus, the sounds may be output by using the display panel 300 as a vibrating surface through the sound generator 510 that is not exposed to the outside. Therefore, a speaker disposed on the front surface of the display device for outputting sounds, such as another party's voice, may be obviated. Accordingly, the transmission part DA100 of the cover window 100 may be widened, and thus an area where pictures are displayed by the display panel 300 may be increased.

Figure 6:
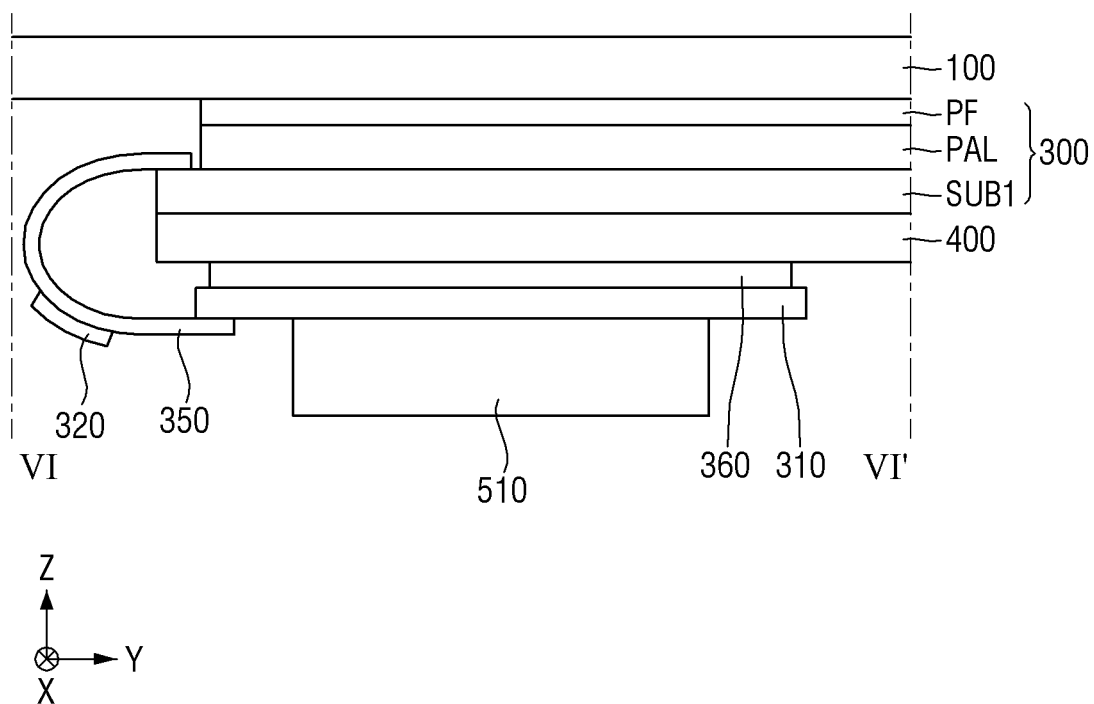
FIG. 6 is a cross-sectional view taken along line VI-VI' of FIG. 3.

FIG. 6 is a cross-sectional view taken along line VI-VI' of FIG. 3.

Referring to FIG. 6, the display panel 300 may include a substrate SUB1, a pixel array layer PAL, and a polarizing film PF.

The substrate SUB1 may be a rigid substrate or may be a flexible substrate that is bendable, foldable, rollable, or the like. The substrate SUB1 may be made of an insulating material such as glass, quartz, polymer resin, and the like. Examples of the polymer material may include polyethersulphone (PES), polyacrylate (PA), polyarylate (PAR), polyetherimide (PEI), polyethylenenaphthalate (PEN), polyethylene terephthalate (PET), polyphenylenesulfide (PPS), polyallylate, polyimide (PI), polycarbonate (PC), cellulose triacetate (CAT), cellulose acetate propionate (CAP), or a combination thereof. The substrate SUB1 may contain a metal material.

Figure 7:
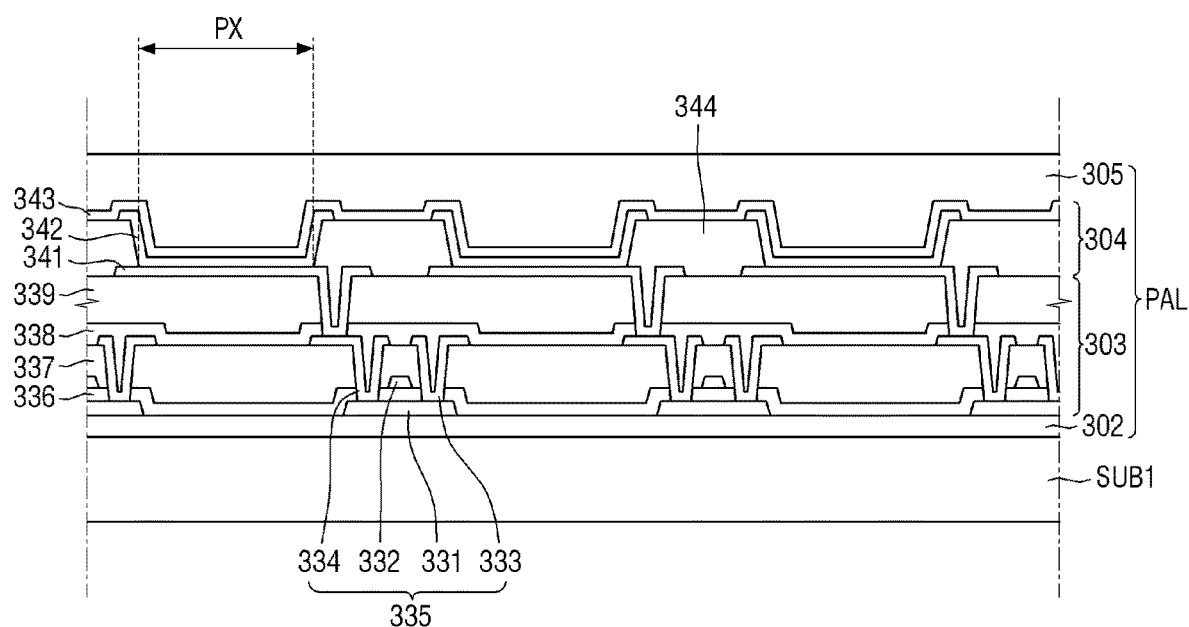
FIG. 7 is a cross-sectional view of an exemplary embodiment of a pixel array layer and a substrate of a display area of the display panel of FIG. 1.

The pixel array layer PAL may be disposed on the substrate SUB1. The pixel array layer PAL may be a layer that includes pixels PX to display images. As shown in FIG. 7, which will be described below, the pixel array layer PAL may include a thin film transistor layer 303, a light emitting element layer 304, and a thin film encapsulation layer 305.

The polarizing film PF may be disposed on the pixel array layer PAL in order to prevent visibility deterioration due to reflection of external light. The polarizing film PF may include a linear polarizer and a phase delay film such as a quarter-wave plate. In this case, the phase delay film may be disposed on the pixel array layer PAL, and the linear polarizer may be disposed between the phase delay film and the cover window 100.

The lower panel cover 400 may be disposed on a first surface of the display panel 300, and the cover window 100 may be disposed on a second surface of the display panel 300. That is, the lower panel cover 400 may be disposed on the substrate SUB1 of the display panel 300, and the cover window 100 may be disposed on the polarizing film PF.

The display circuit board 310 may be disposed on the lower panel cover 400. The display circuit board 310 may have a first surface facing the lower panel cover 400 and a second surface opposite to the first surface. As shown in FIG. 6, the display circuit board 310 may be attached and fastened to the lower panel cover 400 through the adhesive member 360 such as a pressure sensitive adhesive (PSA), but exemplary implementations are not limited thereto. For example, the display circuit board 310 may be fastened to the lower panel cover 400 through a fastening member such as a screw.

One side of the flexible film 350 may be attached to one surface of the substrate SUB1 using an anisotropic conductive film. The other side of the flexible film 350 may be attached to the second surface of the display circuit board 310 using an anisotropic conductive film.

The sound generator 510 may be disposed on the second surface of the display circuit board 310. The sound generator 510 may have a first surface facing the display circuit board 310 and a second surface opposite to the first surface.

The sound generator 510 is illustrated as being disposed on the display circuit board 310 in FIG. 6, but the exemplary implementations are not limited thereto. For example, the flexible film 350 may be disposed on the second surface of the display circuit board 310, and the sound generator 510 may be disposed on the first surface of the flexible film 350. In this case, the flexible film 350 may have a first surface where the sound generator 510 is to be disposed and a second surface opposite to the first surface wherein the second surface is a surface facing the display circuit board 310.

FIG. 7 is a cross-sectional view of an exemplary embodiment of a pixel array layer and a substrate of a display area of the display panel of FIG. 1.

Referring to FIG. 7, the pixel array layer PAL may include the thin film transistor layer 303, the light emitting element layer 304, and the thin film encapsulation layer 305, as shown in FIG. 7.

A buffer film 302 may be formed on the substrate SUB1. The buffer film 302 may be formed on the substrate SUB1 in order to protect light emitting elements and thin film transistors 335 against moisture penetrating through the substrate SUB1, which is vulnerable to moisture penetration. The buffer film 302 may be made of a plurality of inorganic films that are alternately stacked. For example, the buffer film 302 may be formed as multiple films obtained by alternately stacking one or more inorganic films selected from among a silicon oxide film ($SiO_x$), a silicon nitride film ($SiN_x$), a silicon oxynitride film (SiON). The buffer film may be omitted.

The thin film transistor layer 303 is formed on the buffer film 302. The thin film transistor layer 303 includes thin film transistors 335, a gate dielectric 336, an interlayer dielectric 337, a protective film 338, and a planarization film 339.

Each of the thin film transistors 335 includes an active layer 331, a gate electrode 332, a source electrode 333, and a drain electrode 334. In FIG. 7, the thin film transistor 335 is illustrated as being formed by an upper gate (top gate) scheme in which the gate electrode 332 is located above the active layer 331, but it should be noted that exemplary implementations are not limited thereto. That is, the thin film transistor 335 may be formed by a lower gate (bottom gate) scheme in which the gate electrode 332 is located below the active layer 331 or by a double gate scheme in which the gate electrode 332 is located both above and below the active layer 331.

The active layer 331 is formed on the buffer film 302. The active layer 331 may be formed of a silicon-based semiconductor material or an oxide-based semiconductor material. For example, the active layer 331 may be formed of polysilicon, amorphous silicon, or oxide semiconductor. A light blocking layer for blocking external light incident on the active layer 331 may be formed between the buffer film 302 and the active layer 331.

The gate dielectric 336 may be formed on the active layer 331. The gate dielectric 336 may be formed as an inorganic film, for example, a silicon oxide film ($SiO_x$), a silicon nitride film ($SiN_x$), or multiple layers thereof.

The gate electrode 332 and a gate line may be formed on the gate dielectric 336. The gate electrode 332 and the gate line may be formed in a single layer or multiple layers made of any one of molybdenum (Mo), aluminum (Al), chrome (Cr), gold (Au), titanium (Ti), nickel (Ni), neodymium (Nd), and copper (Cu) or an alloy thereof.

The interlayer dielectric 337 may be formed on the gate electrode 332 and the gate line. The interlayer dielectric 337 may be formed as an inorganic film, for example, a silicon oxide film ($SiO_x$), a silicon nitride film ($SiN_x$), or multiple layers thereof.

The source electrode 333, the drain electrode 334, and a data line may be formed on the interlayer dielectric 337. Each of the source electrode 333 and the drain electrode 334 may be in contact with the active layer 331 through a contact hole passing through the gate dielectric 336 and the interlayer dielectric 337. The source electrode 333, the drain electrode 334, and the data line may be formed in a single layer or multiple layers made of any one of molybdenum (Mo), aluminum (Al), chrome (Cr), gold (Au), titanium (Ti), nickel (Ni), neodymium (Nd), and copper (Cu) or an alloy thereof.

The protective film 338 may be formed on the source electrode 333, the drain electrode 334, and the data line to insulate the thin film transistor 335. The protective film 338 may be formed as an inorganic film, for example, a silicon oxide film ($SiO_x$), a silicon nitride film ($SiN_x$), or multiple layers thereof.

The planarization film 339 may be formed on the protective film 338 to planarize a step caused by the thin film transistor 335. The planarization film 339 may be formed as an organic film such as acryl resin, epoxy resin, phenolic resin, polyamide resin, polyimide resin, and the like.

The light emitting element layer 304 is formed on the thin film transistor layer 303. The light emitting element layer 304 includes light emitting elements and a pixel defining film 344.

The light emitting elements and the pixel defining film 344 are formed on the planarization film 339. The light emitting elements are illustrated as organic light emitting elements, each of which includes an anode electrode 341, light emitting layers 342, and a cathode electrode 343.

The anode electrode 341 may be formed on the planarization film 339. The anode electrode 341 may be in contact with the source electrode 333 of the thin film transistor 335 through a contact hole passing through the protective film 338 and the planarization film 339.

In order to partition pixels, the pixel defining film 344 may be formed on the planarization film 339 to cover an edge of the anode electrode 341. That is, the pixel defining film 344 serves as a film that defines pixels. Each of the pixels indicates an area formed by sequentially stacking the anode electrode 341, the light emitting layer 342, and the cathode electrode 343 to emit light due to the combination of holes originating from the anode electrode 341 with electrons originating from the cathode electrode 343 in the light emitting layer 342.

The light emitting layers 342 are formed on the anode electrode 341 and the pixel defining film 344. The light emitting layer 342 may be an organic light emitting layer. The light emitting layer 342 may emit one of red light, green light, and blue light. Alternatively, the light emitting layer 342 may be a layer that emits white light. The light emitting layer 342 may be formed by stacking a red light emitting layer, a green light emitting layer, and a blue light emitting layer and may be a common layer formed in the pixels in common. In this case, the display panel 300 may further include a separate color filter for representing red, green, and blue.

The light emitting layer 342 may include a hole transporting layer, a light emitting layer, and an electron transporting layer. Also, the light emitting layer 342 may be formed to have a tandem structure having two or more stacks. In this case, a charge generation layer may be formed between the stacks.

The cathode electrode 343 is formed on the light emitting layer 342. The cathode electrode 343 may be formed to cover the light emitting layer 342. The cathode electrode 343 may be a common layer formed in the pixels in common.

When the light emitting element layer 304 is formed by a top emission scheme in which light is emitted upward, the anode electrode 341 may be formed of a metal material having high reflectance such as a structure of stacking aluminum and titanium (Ti/Al/Ti), a structure of stacking aluminum and indium tin oxide (ITO) (ITO/Al/ITO), an APC alloy, and a structure of stacking an APC alloy and indium tin oxide (ITO) (ITO/APC/ITO). The APC alloy is an alloy of silver (Ag), palladium (Pd), and copper (Cu). Also, the cathode electrode 343 may be formed of a transparent metal material (e.g., a transparent conductive material (TCO)) such as indium tin oxide (ITO) or indium zinc oxide (IZO), which is capable of transmitting light, or may be formed of a translucent metal material (e.g., a semi-transmissive conductive material) such as magnesium (Mg), silver (Ag), or an alloy of magnesium (Mg) and silver (Ag). When the cathode electrode 343 is formed of a translucent metal material, light emission efficiency may be increased by a micro cavity.

When the light emitting element layer 304 is formed by a bottom emission scheme in which light is emitted downward, the anode electrode 341 may be formed of a transparent metal material (e.g., a transparent conductive material (TCO)) such as indium tin oxide (ITO) or indium zinc oxide (IZO) or may be formed of a translucent metal material (e.g., a semi-transmissive conductive material) such as magnesium (Mg), silver (Ag), or an alloy of magnesium (Mg) and silver (Ag). Also, the cathode electrode 343 may be formed of a metal material having high reflectance such as a structure of stacking aluminum and titanium (Ti/Al/Ti), a structure of stacking aluminum and indium tin oxide (ITO) (ITO/Al/ITO), an APC alloy, and a structure of stacking APC alloy and indium tin oxide (ITO) (ITO/APC/ITO). When the anode electrode 341 is formed of a translucent metal material, light emission efficiency may be increased by a micro cavity.

The thin film encapsulation layer 305 is formed on the light emitting element layer 304. The thin film encapsulation layer 305 serves to prevent oxygen or moisture from penetrating into the light emitting layer 342 and the cathode electrode 343. To this end, the thin film encapsulation layer 305 may include at last one inorganic film. The inorganic film may be formed of silicon nitride, aluminum nitride, zirconium nitride, titanium nitride, hafnium nitride, tantalum nitride, silicon oxide, aluminum oxide, or titanium oxide. Also, the thin film encapsulation layer 305 may further include at least one organic film. The organic film may be formed to a sufficient thickness to prevent particles from penetrating into the light emitting layer 342 and the cathode electrode 343 through the thin film encapsulation layer 305. The organic film may contain at least one of epoxy, acrylate, and urethane acrylate.

A touch sensor layer may be formed on the thin film encapsulation layer 305. When the touch sensor layer is formed on the thin film encapsulation layer 305, the thickness of the display device 10 may be reduced compared to when a separate touch panel is attached to the thin film encapsulation layer 305.

The touch sensor layer may include sensor electrodes for sensing a user's touch in a capacitance scheme and sensor lines for connecting the sensor electrodes to pads. For example, the touch sensor layer may sense whether there is a user's touch or proximity in a self-capacitance scheme and in a mutual-capacitance scheme.

Figure 8:
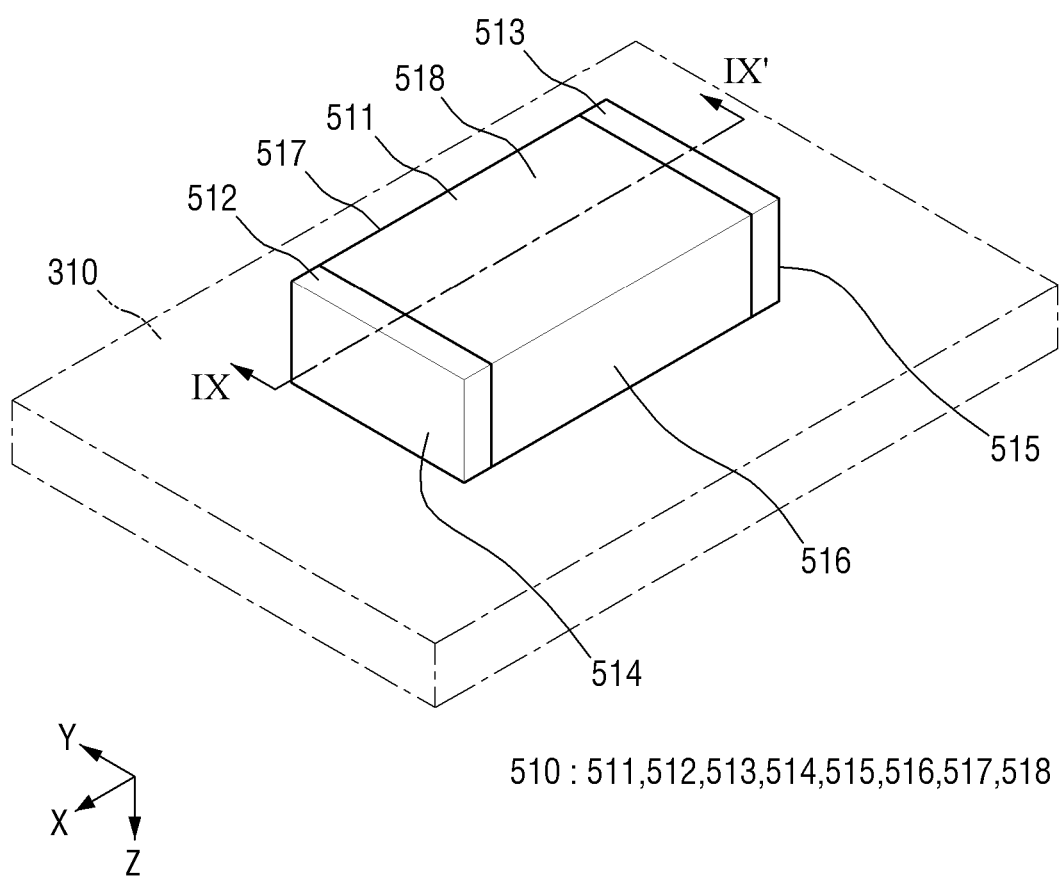
FIG. 8 is a perspective view of an exemplary embodiment of a sound generator disposed on a display circuit board of an area A of FIG. 3.
Figure 9:
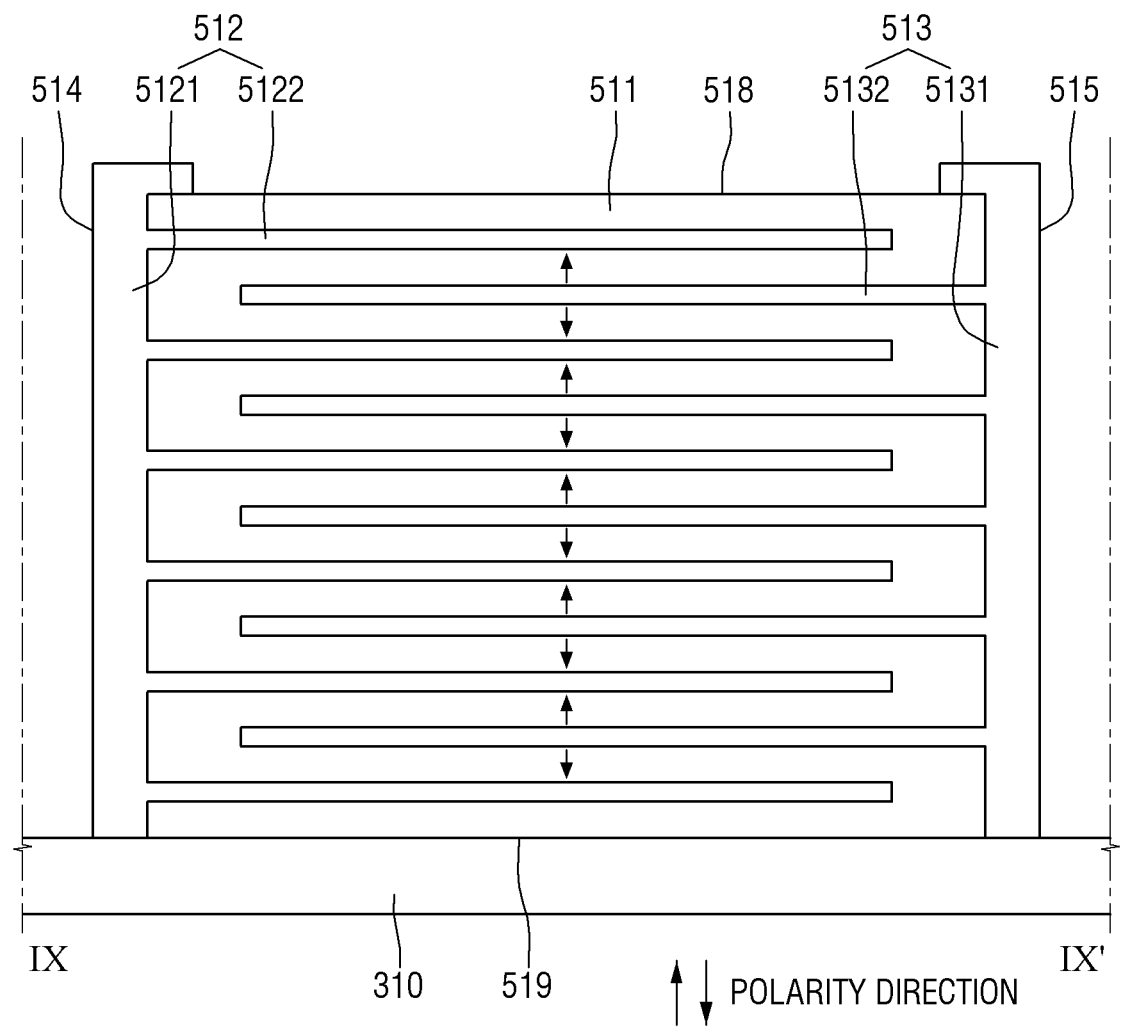
FIG. 9 is a cross-sectional view taken along line IX-IX' of FIG. 8.
Figure 10:
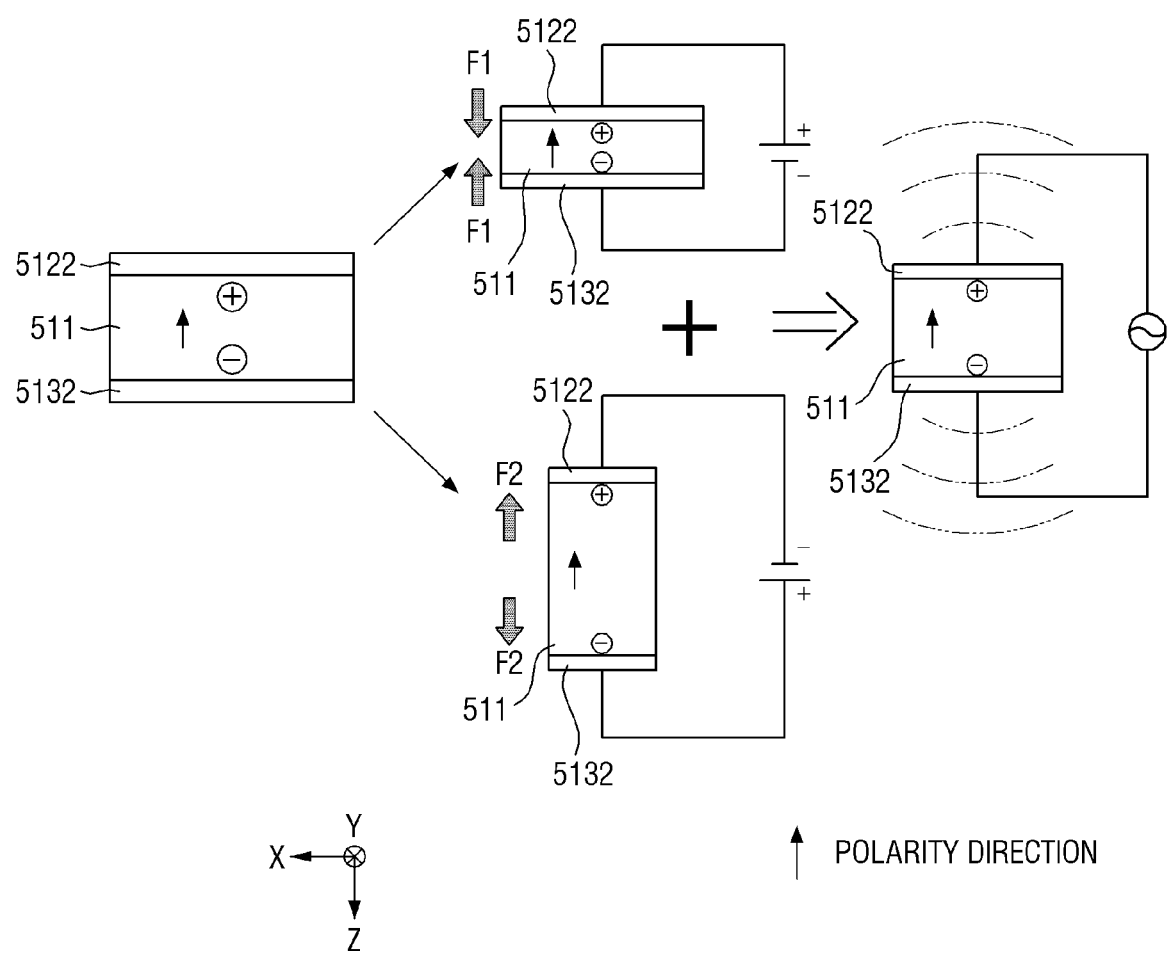
FIG. 10 is a diagram illustrating an exemplary vibration method of a vibration layer disposed between a first internal electrode and a second internal electrode of a sound generator.
Figure 11:
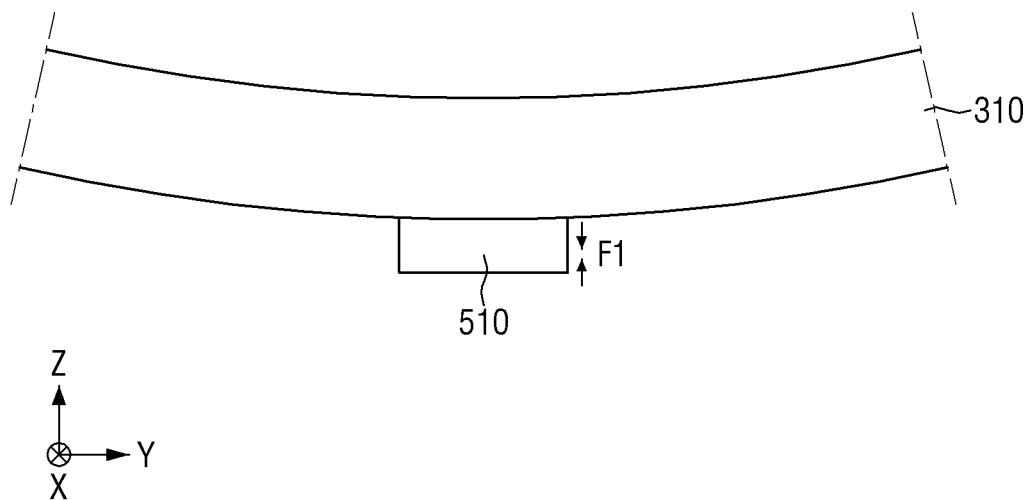
FIGS. 11 and 12 are schematic diagrams illustrating an exemplary vibration method of the display panel due to vibration of the sound generator of FIG. 10.
Figure 12:
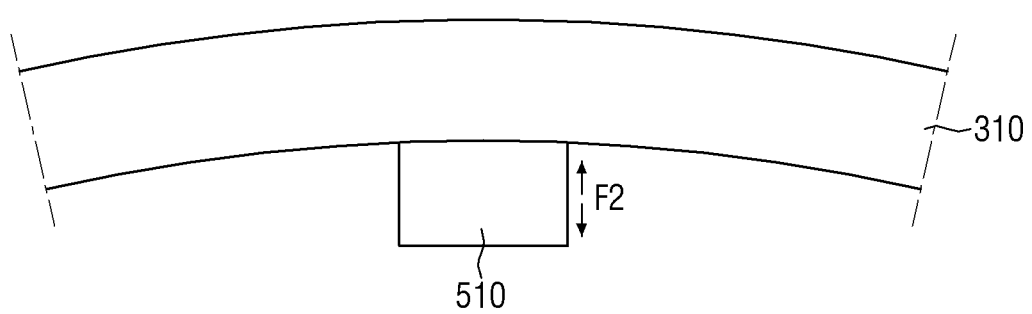
Figure 12:
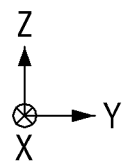

FIG. 8 is a perspective view of an exemplary embodiment of a sound generator disposed on a display circuit board of an area A of FIG. 3. FIG. 9 is a cross-sectional view taken along line IX-IX' of FIG. 8. FIG. 10 is a diagram illustrating an exemplary vibration method of a vibration layer disposed between a first internal electrode and a second internal electrode of a sound generator. FIGS. 11 and 12 are schematic diagrams illustrating an exemplary vibration method of the display panel due to vibration of the sound generator of FIG. 10.

FIGS. 8 to 10 are views showing an example of the area A of FIG. 3, which is a bottom view of a display panel. It should be noted that the third direction (the Z-axis direction) is a downward direction in the drawings.

Referring to FIGS. 8 to 12, the sound generator 510 may include a lower surface 518, and an upper surface 519, and side surfaces 514-517, which extend between the lower and upper surfaces. The sound generator 510 may have a generally planar rectangular shape. For example, the sound generator 510 may have a planar shape of a rectangle including long sides in the first direction (the X-axis direction) and short sides in the second direction (the Y-axis direction). However, exemplary implementations are not limited thereto, and the generally planar shape of the sound generator 510 may include a generally polygon shape other than the rectangle, a circle, or an ellipse.

The sound generator 510 may have a piezoelectric element or a piezoelectric actuator for vibrating the display panel 300 using a piezoelectric material that contracts or expands according to an applied voltage, but the exemplary embodiments are not limited thereto. The sound generator 510 may include a vibration layer 511, a first electrode 512, and a second electrode 513.

The first electrode 512 may be formed at the one side surface 514 of the sound generator 510. The first electrode 512 may be disposed atone end of the short sides 514 of the sound generator 510 in the second direction (the Y-axial direction) to form one side surface 514 of the sound generator 510 when viewed from the top down. As shown in FIG. 8, the first electrode 512 may form a first side surface 514 of the sound generator 510. The first electrode 512 may extend in the second direction (the Y-axis direction) from the right of the sound generator 510 when viewed from the top down.

The second electrode 513 may be formed at the other side surface 515 of the sound generator 510. The other surface 515 of the sound generator 510 where the second electrode 513 is disposed may be a surface 515 that faces the side surface 514 where the first electrode 512 is disposed. The second electrode 513 may be disposed at the other end 515 of the short sides of the sound generator 510 in the second direction (the Y-axial direction) to form a second side surface 515 of the sound generator 510. The second electrode 513 may extend in the second direction (the Y-axis direction) from the left of the sound generator 510 when viewed from the top down. As shown in FIG. 8, the first side surface 514 of the sound generator 510 may be the left surface, and the second side surface 515 may be the right surface.

The first electrode 512 may include a first external electrode 5121 and first internal electrodes 5122. The first external electrode 5121 may be disposed on the first side surface of the vibration layer 511, as shown in FIG. 9. Alternatively, the first external electrode 5121 may be disposed through a portion of the vibration layer 511. The first external electrode 5121 may be disposed over the side surface of the vibration layer 511 and on at least a portion of the lower surface of the vibration layer 511.

The first internal electrodes 5122 may be branched from the first external electrode 5121. The first internal electrodes 5122 may be arranged to be generally parallel with one another in the horizontal direction (the X-axis direction or the Y-axis direction).

The second electrode 513 may include a second external electrode 5131 and second internal electrodes 5132. The second electrode 513 may be spaced apart from the first electrode 512 in the first direction (the X-axis direction). Thus, the second electrode 513 may be electrically separated from the first electrode 512. The second external electrode 5131 may be disposed on at least one side surface of the vibration layer 511.

The first external electrode 5121 may be disposed on one side surface 514 of the sound generator 510, and the second external electrode 5131 may be disposed on the other side surface 515 opposite to the one side surface 514 of the sound generator 510. In an embodiment, the first external electrode 5121 may be disposed on the first side surface of the vibration layer 511, and the second external electrode 5131 may be disposed on the second side surface of the vibration layer 511. Alternatively, the second external electrode 5131 may be disposed through a portion of the vibration layer 511. The second external electrode 5131 may extend from one side surface of the vibration layer 511 and may be disposed over the side surface of the vibration layer 511 and on at least a portion of the lower surface of the vibration layer 511. The first external electrode 5121 and the second external electrode 5131 disposed on the lower surface of the vibration layer 511 may be spaced apart from each other. Accordingly, at least a portion of the vibration layer 511, which will be described below, will be exposed in the third direction (the Z-axis direction) by the first external electrode 5121 and/or the second external electrode 5131.

The second internal electrodes 5132 may be branched from the second external electrode 5131. The second internal electrodes 5132 may be arranged to be generally parallel with one another in the horizontal direction (the X-axis direction or the Y-axis direction).

The first internal electrodes 5122 and the second internal electrode 5132 may be alternately arranged in the third direction (the Z-axis direction). The first internal electrodes 5122 and the second internal electrodes 5132 may be repeatedly arranged in the order of the first internal electrode 5122, the second internal electrode 5132, the first internal electrode 5122, and the second internal electrode 5132 in the third direction (the Z-axis direction).

The first external electrode 5121 and the second external electrode 5131 may be exposed instead of being covered with the vibration layer 511. The first external electrode 5121 and the second external electrode 5131 may form an external electrode that is exposed to the outside of the sound generator 510. The first external electrode 5121 may be a first external electrode 5121 forming the first side surface 514 of the sound generator 510. The second external electrode 5131 may be a second external electrode 5131 forming the second side surface 515 of the sound generator 510.

The first internal electrodes 5122 and the second internal electrodes 5132 may be surrounded by the vibration layer 511, the first external electrode 5121, and the second external electrode 5131 and may be disposed inside the sound generator 510. The first internal electrodes 5122 and the second internal electrodes 5132 may be exposed to the outside. Accordingly, the first internal electrodes 5122 and the second internal electrodes 5132 may form internal electrodes that are not exposed to the outside of the sound generator 510. The first internal electrodes 5122 may be first internal electrodes 5122 forming the internal electrodes of the sound generator 510.

The first external electrode 5121 may be disposed at the first side surface 514, the lower surface 518, and the upper surface 519 of the sound generator 510. The first external electrode 5121 may cover at least a portion of the first side surface, the lower surface, and the lower surface of the vibration layer 511.

The first external electrode 5121 may be disposed on the first side surface 514 of the sound generator 510 to cover a portion of the upper surface and/or the lower surface of the vibration layer 511. Also, the second external electrode 5131 may be disposed on the second side surface 515 of the sound generator 510 to cover a portion of the upper surface and/or the lower surface of the vibration layer 511. In this case, the thickness in the third direction on the first side surface 514 and/or the second side surface 515 of the sound generator may be greater than the thickness in the third direction in the area where the vibration layer 511 is disposed. Accordingly, the sound generator 510 may have a recess formed in the area where the vibration layer 511 is disposed.

The vibration layer 511 may be a piezoelectric element that is deformable according to a driving voltage applied to the first electrode 512 and a driving voltage applied to the second electrode 513. In this case, the vibration layer 511 may be any one of a polyvinylidene fluoride (PVDF) film, piezoelectric materials such as plumbum zirconate titanate (PZT), and electroactive polymers.

Since the material forming the vibration layer 511 has a high manufacturing temperature of about 1100° C., the first electrode 512 and the second electrode 513 may be formed of silver (Ag) having a high melting point or an alloy of silver (Ag) and palladium (Pd). In order to increase the melting points of the first electrode 512 and the second electrode 513, when the first electrode 512 and the second electrode 513 are formed of an alloy of silver (Ag) and palladium (Pd), the content of silver (Ag) may be higher than the content of palladium (Pd).

The vibration layer 511 may be disposed between each of the first internal electrodes 5122 and a corresponding one of the second internal electrodes 5132. The vibration layer 511 may contract or expand depending on the difference between the driving voltage applied to the first internal electrodes 5122 and the driving voltage applied to the second internal electrodes 5132.

As shown in FIGS. 9 and 10, when the polarity direction of the vibration layer 511 disposed between the first internal electrode 5122 and the second internal electrode 5132 disposed below the first internal electrode 5122 is a downward direction (T, the opposite direction to the Z-axis direction), the vibration layer 511 may have a positive polarity in a lower area adjacent to the first internal electrode 5122 and may have a negative polarity in an upper area adjacent to the second internal electrode 5132. Also, when the polarity direction of the vibration layer 511 disposed between the second internal electrode 5132 and the first internal electrode 5122 disposed above the second internal electrode 5132 is an upward direction (J, the Z-axis direction), the vibration layer 511 may have a negative polarity in a lower area adjacent to the second internal electrode 5132 and may have a positive polarity in an upper area adjacent to the first internal electrode 5122. The polarity direction of the vibration layer 511 may be determined by a poling process in which an electric field is applied to the vibration layer 511 using the first internal electrode 5122 and the second internal electrode 5132.

In detail, as shown in FIG. 10, when the polarity direction of the vibration layer 511 disposed between the first internal electrode 5122 and the second internal electrode 5132 disposed above the first internal electrode 5122 is a downward direction (T, the opposite direction to the Z-axis direction), a driving voltage having a positive polarity may be applied to the first internal electrode 5122, and a driving voltage having a negative polarity may be applied to the second internal electrode 5132. In this case, the vibration layer 511 may contract according to a first force F1. The first force F1 may be a contractive force. Also, when a driving force having a negative polarity is applied to the first internal electrode 5122 and a driving force having a positive polarity is applied to the second internal electrode 5132, the vibration layer 511 may expand due to a second force F2. The second force F2 may be an expansive force.

Similarly, when the polarity direction of the vibration layer 511 disposed between the second internal electrode 5132 and the first internal electrode 5122 disposed above the second internal electrode 5132 is an upward direction (J, the Z-axis direction), a driving voltage of a positive polarity may be applied to the second internal electrode 5132, and a driving voltage of a negative polarity may be applied to the first internal electrode 5122. In this case, the vibration layer 511 may expand due to the expansive force. Also, when a driving force having a negative polarity is applied to the second internal electrode 5132 and a driving force having a positive polarity is applied to the first internal electrode 5122, the vibration layer 511 may contract due to the contractive force.

When the driving voltage applied to the first electrode 512 and the driving voltage applied to the second electrode 513 alternately and repeatedly have a positive polarity and a negative polarity, the vibration layer 511 repeatedly contracts and expands as shown in FIGS. 11 and 12. Thus, the sound generator 510 vibrates. When the vibration layer 511 of the sound generator 510 contracts or expands, the display circuit board 310 vibrates in the third direction (the Z-axis direction), which is the thickness direction of the display device 10, due to stress as shown in FIGS. 11 and 12. When the display circuit board 310 vibrates due to the contraction and/or expansion of the vibration layer 511, the display panel 300 where the display circuit board is disposed also vibrates in the third direction (the Z-axis direction), which is the thickness direction of the display device 10.

According to the exemplary embodiments shown in FIGS. 6 and 8 to 12, the sound generator 510 may output sounds in the sound mode by vibrating the display panel 300 according to the first driving voltage and the second driving voltage. In an exemplary embodiment, the first driving voltage may be applied to the first electrode 512 of the sound generator 510, and the second driving voltage may be applied to the second electrode 513 of the sound generator 510 to drive the sound generator 510.

Figure 13:
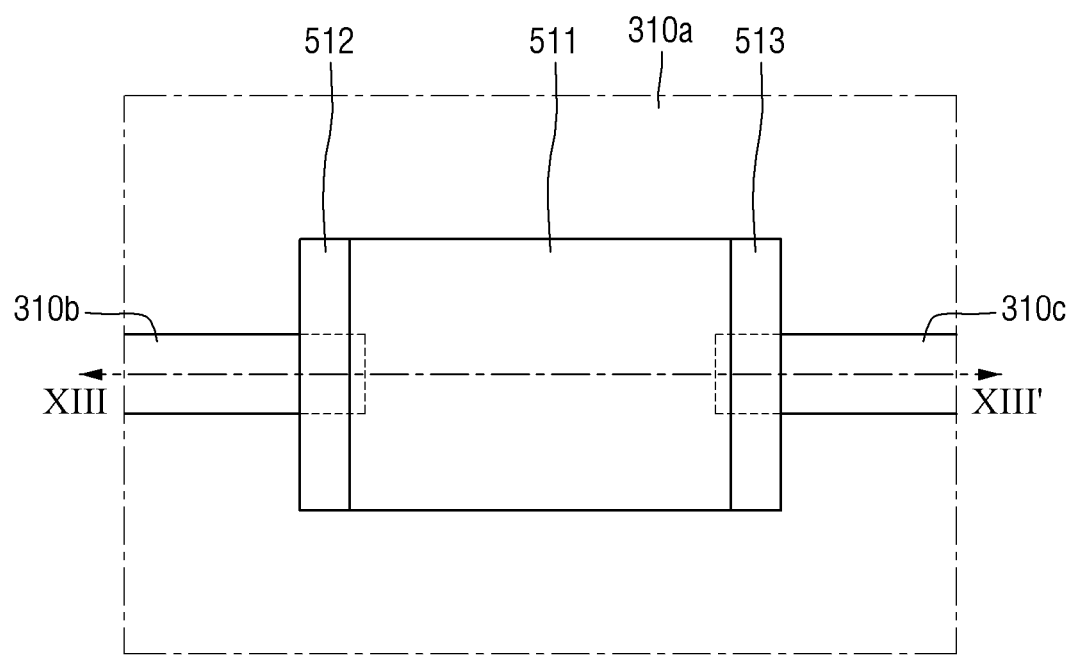
FIG. 13 is a bottom, plan view of an exemplary embodiment of the sound generator, lead lines, and base layer of FIG. 8.
Figure 14:
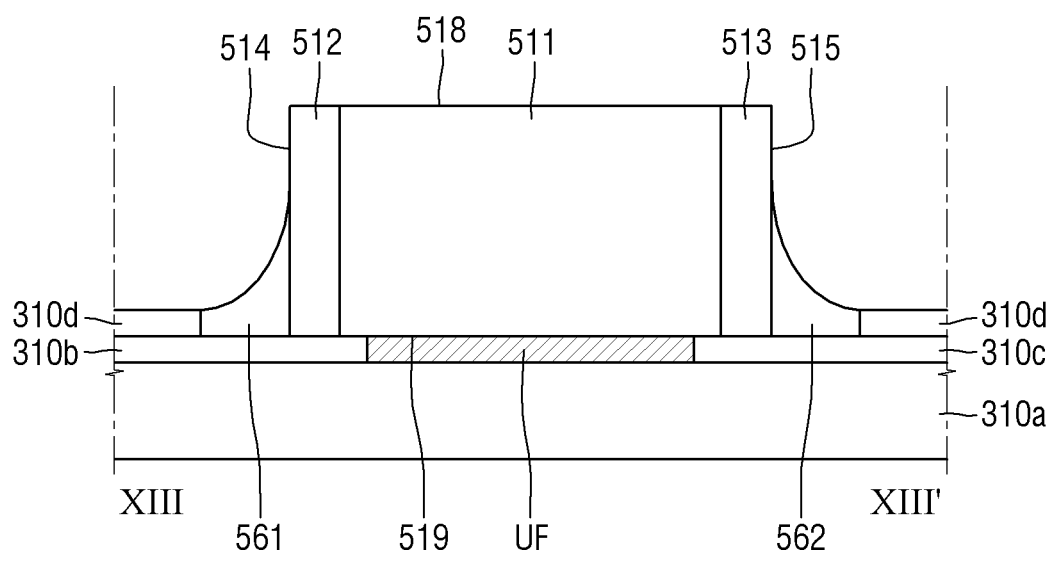
FIG. 14 is a cross-sectional view taken along line XIII-XIII' of FIG. 13.
Figure 14:
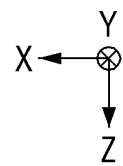

FIG. 13 is a bottom, plan view of an exemplary embodiment of the sound generator, lead lines, and base layer of FIG. 8. FIG. 14 is a cross-sectional view taken along line XIII-XIII' of FIG. 13. FIG. 13 is a bottom view, and FIG. 14 is a cross-sectional view of FIG. 13. Thus, it should be noted that the third direction (the Z-axis direction) of FIG. 14 is a downward direction in the drawings.

Referring to FIGS. 13 and 14, the display circuit board 310 may include a base layer 310a, lead lines 310b and 310c disposed on the base layer 310a, and a solder resist layer 310d disposed on the lead lines 310b and 310c. For clarity, FIG. 8 does not show certain elements referenced by and shown in FIGS. 13 and 14, as discussed below.

The base layer 310a may be formed of rigid or flexible plastic. The base layer 310a may be attached and fastened to the lower panel cover 400 through a fastening member such as a screw. The base layer 310a may have a first surface facing the lower panel cover 400 and a second surface opposite to the first surface.

The lead lines 310b and 310c may be disposed on the second surface of the base layer 310a. In FIG. 13, certain elements, such as the resist layer 310d and the first and second soldering parts 561 and 562 are not shown in order to reveal the lead lines 310b and 310c. The lead lines 310b and 310c may include a first lead line 310b and a second lead line 310c. The second lead line 310c may be disposed on the second surface of the base layer 310a and spaced apart from the first lead line 310b. Accordingly, the first lead line 310b and the second lead line 310c may expose at least a portion of the base layer 310a in the thickness direction. In an exemplary embodiment, the first lead line 310b and the second lead line 310c may be spaced apart from each other in the first direction (the X-axis direction).

The solder resist layer 310d may be disposed on the first lead line 310b and the second lead line 310c. The solder resist layer 310d may expose at least a portion of the first lead line 310b and the second lead line 310c in the thickness direction. The solder resist layer 310d refers to an insulating layer for protecting the lead lines 310b and 310c.

The sound generator 510 may be disposed on the base layer 310a. The sound generator 510 may be disposed on the base layer 310a exposed by the lead lines 310b and 310c. Accordingly, a space may be formed between the base layer 310a exposed by the lead lines 310b and 310c and the sound generator 510.

The first electrode 512 of the sound generator 510 may be disposed on the first lead line 310b. The first electrode 512 of the sound generator 510 may be disposed on the first lead line 310b that is not covered with the solder resist layer 310d of the display circuit board 310 but exposed. The first external electrode 5121 of the first electrode 512 may be at least partially overlapped with the first lead line 310b exposed by the solder resist layer 310d in the third direction Z. In FIGS. 9 and 14, the upper surface of the first external electrode 5121 of the first electrode 512 is illustrated as being in contact with the lower surface of the first lead line 310b, but exemplary implementations are not limited thereto. A filling layer UF, which will be described below, may be disposed on a portion between the first external electrode 5121 and the first lead line 310b. The second electrode 513 of the sound generator 510 may be disposed on the second lead line 310c. The second electrode 513 of the sound generator 510 may be disposed on the second lead line 310c that is not covered with the solder resist layer 310d of the display circuit board 310. The second external electrode 5131 of the second electrode 513 may be at least partially overlapped with the second lead line 310c exposed by the solder resist layer 310d in the third direction (the Z-axis direction). In FIGS. 9 and 14, the upper surface of the second external electrode 5131 of the second electrode 513 is illustrated as being in contact with the lower surface of the second lead line 310c, but exemplary implementations are not limited thereto. A filling layer UF, which will be described below, may be disposed on a portion between the second external electrode 5131 and the second lead line 310c.

The first lead line 310b that is not covered with the solder resist layer 310d but exposed may be electrically connected to the first electrode 512 of the sound generator 510 through a first soldering part 561. The first soldering part 561 may come into contact with the first electrode 512 and the first lead line 310b. The first soldering part 561 refers to an area for connecting the first lead line 310b and the first electrode 512 through soldering.

The first soldering part 561 may be disposed on the first lead line 310b exposed by the sound generator 510 and the solder resist layer 310d. The first soldering part 561 may be disposed on one surface of the first lead line 310b exposed in the thickness direction to entirely cover the first lead line 310b. The first soldering part 561 disposed on one surface of the first lead line 310b may extend toward the solder resist layer 310d disposed on the first lead line 310b and cover up to a portion of the lower surface of the solder resist layer 310d. In the drawing, the first soldering part 561 is illustrated as entirely covering one surface of the first lead line 310b exposed in the thickness direction, but exemplary implementations are not limited thereto. The first soldering part 561 may cover only a portion of the one surface of the first lead line 310b.

The first soldering part 561 may extend from one surface of the first lead line 310b to the sound generator 510 and thus may be disposed on the first side surface 514 of the sound generator 510. That is, the first soldering part 561 may be in contact with the first external electrode 5121 of the first electrode 512 of the sound generator 510. The first soldering part 561 may be disposed on a side surface of the first external electrode 5121 to come into contact with at least a portion of the side surface of the first external electrode 5121.

The second lead line 310c that is not covered with the solder resist layer 310d but exposed may be electrically connected to the second electrode 513 of the sound generator 510 through a second soldering part 562. The second soldering part 562 may come into contact with the second electrode 513 and the second lead line 310c. The second soldering part 562 refers to an area for connecting the second lead line 310c and the second electrode 513 through soldering.

The second soldering part 562 may be disposed on the second lead line 310c exposed by the sound generator 510 and the solder resist layer 310d. The second soldering part 562 may be disposed on one surface of the second lead line 310c exposed in the thickness direction to entirely cover the second lead line 310c. The second soldering part 562 disposed on one surface of the second lead line 310c may extend toward the solder resist layer 310d disposed on the second lead line 310c and cover up to a portion of the side surface and the lower surface of the solder resist layer 310d. In the drawing, the second soldering part 562 is illustrated as entirely covering one surface of the second lead line 310c exposed in the thickness direction, but exemplary implementations are not limited thereto. The second soldering part 562 may cover only a portion of the one surface of the second lead line 310c.

The second soldering part 562 may extend from one surface of the second lead line 310c to the sound generator 510 and thus may be disposed on the second side surface 515 of the sound generator 510. That is, the second soldering part 562 may be in contact with the second external electrode 5131 of the second electrode 513 of the sound generator 510. The second soldering part 562 may be disposed on a side surface of the second external electrode 5131 to come into contact with at least a portion of the side surface of the second external electrode 5131.

The lead lines 310b and 310c of the display circuit board 310 may be connected to the sound driving circuit 340. The first driving voltage of the sound driving circuit 340 may be applied to the first electrode 512 of the sound generator 510 through the first soldering part 561 and the first lead line 310b. Also, the second driving voltage of the sound driving circuit 340 may be applied to the second electrode 513 of the sound generator 510 through the second lead line 310c and the second soldering part 562.

In this embodiment, the first electrode 512 of the sound generator 510 may be connected to the first lead line 310b of the display circuit board 310 through the first soldering part 561, and the second electrode 513 of the sound generator 510 may be connected to the second lead line 310c of the display circuit board 310 through the second soldering part 562. Therefore, the sound generator 510 may be formed integrally with the display circuit board 310 while the display circuit board 310 is being manufactured. Accordingly, since the sound generator 510 can omit a process or apparatus for separately attaching to the lower surface of the lower panel cover 400, it is possible to reduce manufacturing costs. Also, there is no need to separately provide a space to which the sound generator 510 is attached in the lower panel cover 400.

The filling layer UF may fill the space between the sound generator 510 and the base layer 310a exposed by the first lead line 310b and the second lead line 310c. As shown in FIG. 14, the filling layer UF may fill the space between the sound generator 510 and the base layer 310a to entirely cover the upper surface 519 of the sound generator 510 and the lower surface of the base layer 310a exposed by the first lead line 310b and the second lead line 310c. The filling layer UF disposed between the sound generator 510 and the base layer 310a may extend in the horizontal direction and come into contact with the side surfaces of the first lead line 310b and/or the second lead line 310c.

The sound generator 510 may be stably fastened to the base layer 310a by the filling layer UF. The filling layer UF may be formed of a material including an adhesive or a binder, which is a material having excellent curing or rigidity. For example, the filling layer UF may contain at least one of an epoxy resin, an ethyl cyanoacrylic acid, a methyl methacrylate, and a trifluoroborane. When the filling layer UF uses an epoxy rein as a main binder, a curing agent, a catalyst, a diluent, and a filler may be included in addition to the main binder. The main binder may be a BPA type epoxy resin, a BPF type epoxy resin, or a Cresol Novolac BPA type epoxy resin. The curing agent may be an acid anhydride, a dicyan diamide, or a phenol resin. The catalyst may be one of a tertiary amine group, an imidazole group, or other latent catalysts. The diluent may be a reactive diluent, solvent, or the like, and the filler may be a silica or the like.

The filling layer UF may be substantially entirely disposed in a space between the base layer 310a and the sound generator 510 to deliver vibration of the sound generator 510 to the base layer 310a through the front surface of the filling layer UF. By delivering the vibration of the sound generator 510 to the base layer 310a though the filling layer UF as well as the first soldering part 561 and the second soldering part 562, the sound pressure level may increase due to the enlargement of the vibration surface.

Also, the filling layer UF may serve to distribute stress concentration caused by the first soldering part 561 and the second soldering part 562 disposed on the first side surface 514 and the second side surface 515 of the sound generator 510 into the filling layer UF, which is substantially entirely disposed between the base layer 310*a* and the sound generator 510. Accordingly, when the display device 10 drops and/or receives a shock force, it is possible to reduce the stress delivered to the sound generator.

Furthermore, by further placing the filling layer UF between the base layer 310*a* and the sound generator 510, the fastening force may increase and thus it is possible to improve connection reliability compared to when attachment to the display circuit board 310 is achieved using the first soldering part 561 and the second soldering part 562.

Figure 15:
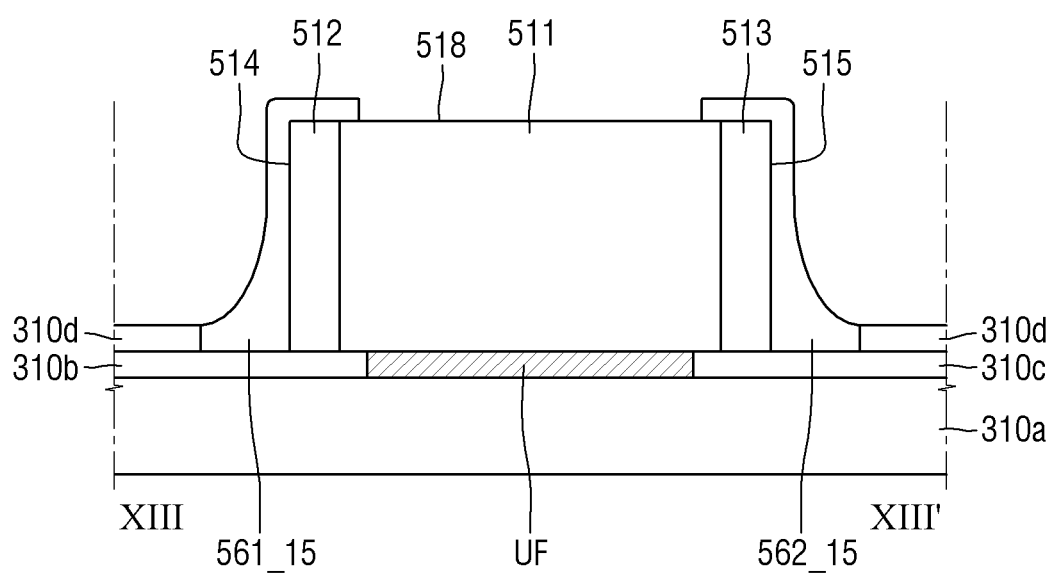
FIG. 15 is a cross-sectional view of another exemplary embodiment of the sound generator, lead lines, and base layer of FIG. 8 taken along line XIII-XIII' of FIG. 13.
Figure 15:
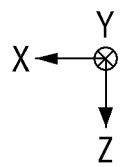

FIG. 15 is a cross-sectional view of another exemplary embodiment of the sound generator, lead lines, and base layer of FIG. 8 taken along line XIII-XIII' of FIG. 13. For clarity, FIG. 8 does not show certain elements referenced by and shown in FIG. 15, as discussed below. Moreover, in FIG. 13, certain elements, such as the resist layer 310*d* and the first soldering parts 561_15 and 562_15 are not shown in order to reveal the lead lines 310*b* and 310*c*. The embodiment of FIG. 15 is different from the embodiment shown in FIG. 14 in that a first soldering part 561_15 and a second soldering part 562_15 extend along the respective side surfaces 514 and 515 of the sound generator 510 and around at least part of the lower surface 518 of the sound generator to cover at least some portions of the lower surface 518. The embodiment of FIG. 15 will be described focusing on the differences from the embodiment shown in FIG. 14.

Referring to FIGS. 9 and 15, the first soldering part 561_15 may extend from one surface of the first lead line 310*b* to the sound generator 510 and thus may be disposed on the first side surface 514 of the sound generator 510. The first soldering part 561_15 may be substantially entirely disposed on the first side surface 514 of the sound generator 510. The first soldering part 561_15 may extend from the first side surface 514 of the sound generator 510 and thus may be disposed on a portion of the lower surface 518 of the sound generator 510. Accordingly, the first soldering part 561_15 may be in contact with the first external electrode 5121 of the first electrode 512 of the sound generator 510. The first soldering part 561_15 may cover the side surface and the lower surface of the first external electrode 5121.

The second soldering part 562_15 may extend from one surface of the second lead line 310*c* to the sound generator 510 and thus may be disposed on the second side surface 515 of the sound generator 510. The second soldering part 562_15 may be substantially entirely disposed on the second side surface 515 of the sound generator 510. The second soldering part 562_15 may extend from the second side surface 515 of the sound generator 510 and thus may be disposed on a portion of the lower surface 518 of the sound generator 510. The first soldering part 561_15 and the second soldering part 562_15 disposed on the lower surface 518 of the sound generator 510 may be spaced apart from each other. The second soldering part 562_15 may be in contact with the second external electrode 5131 of the second electrode 513 of the sound generator 510. The second soldering part 562_15 may entirely cover the side surface and the lower surface of the second external electrode 5131.

Figure 16:
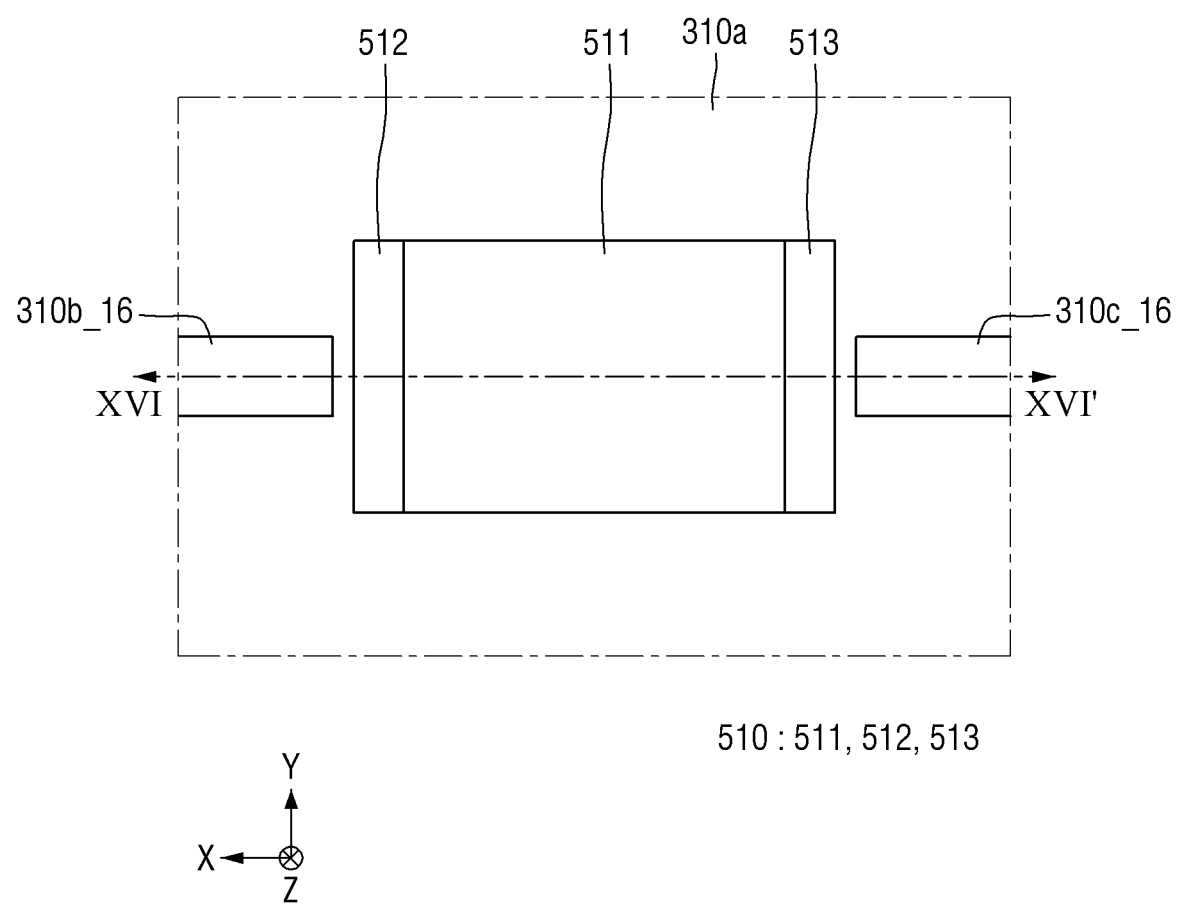
FIG. 16 is a bottom, plan view of another exemplary embodiment of the sound generator, lead lines, and the base layer of FIG. 8.
Figure 17:
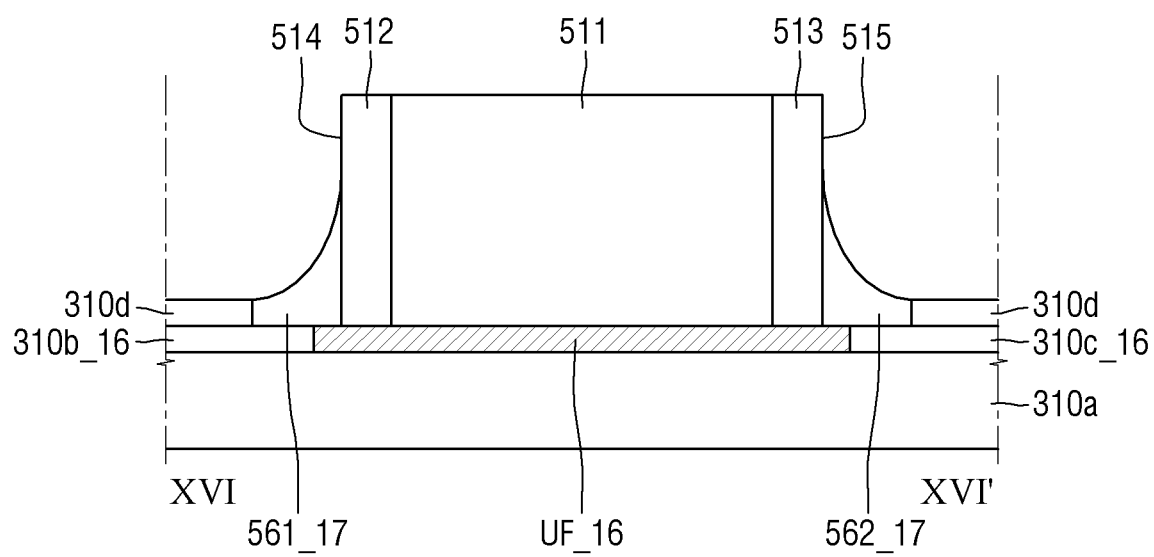
FIG. 17 is a cross-sectional view taken along line XVI-XVI' of FIG. 16.

FIG. 16 is a bottom, plan view of another exemplary embodiment of the sound generator, lead lines, and base layer of FIG. 8. FIG. 17 is a cross-sectional view taken along line XVI-XVI' of FIG. 16.

For clarity, FIG. 8 does not show certain elements referenced by and shown in FIG. 16, as discussed below. Moreover, in FIG. 16, certain elements, such as the resist layer 310*d* and the first soldering parts 561_17 and 562_17 are not shown in order to reveal the lead lines 310*b*_16 and 310*c*_16. The embodiment shown in FIGS. 16 and 17 is different from the embodiment shown in FIGS. 13 and 14 in that the first electrode 512 of the sound generator 510 is not overlapped with the first lead line 310*b*_16 in the thickness direction of the sound generator 510 and the second electrode 513 of the sound generator 510 is not overlapped with the second lead line 310*c*_16 in the thickness direction of the sound generator 510. The embodiment shown in FIGS. 16 and 17 will be described focusing on the differences from the embodiment shown in FIGS. 13 and 14 to avoid redundancy.

Referring to FIGS. 16 and 17, the sound generator 510 may be disposed on a base layer 310*a* exposed by lead lines 310*b*_16 and 130*c*_16. The electrodes 512 and 513 of the sound generator 510 may be overlapped with the lead lines disposed on the base layer 310*a* in the thickness direction of the display circuit board 310. Accordingly, the electrodes 512 and 513 of the sound generator 510 may not be in contact with the lead lines 310*b*_16 and 310*c*_16.

A filling layer UF_16 may be entirely disposed on the base layer 310*a* exposed by the lead lines 310*b*_16 and 310*c*_16. The filling layer UF_16 may be partially exposed by the sound generator 510 in the thickness direction of the display circuit board 310. The filling layer UF_16 may be disposed on up to a portion of the side surface 514 or 515 of the sound generator 510 as well as in a space in the thickness direction between the sound generator 510 and the base layer 310*a*. In this case, the sound generator 510 may have a fastening force in which the sound generator 510 is attached to the display circuit board 310 and which is increased by the filling layer UF_16 serving as a coupler or an adhesive.

The first electrode 512 of the sound generator 510 and the first lead line 310*b*_16 may be electrically connected to each other by the first soldering part 561_17. The first soldering part 561_17 may be in contact with the first lead line 310*b*_16, the filling layer UF_16, and the first electrode 512. Likewise, the second electrode 513 of the sound generator 510 and the second lead line 310*c*_16 may be electrically connected to each other by the second soldering part 562_17. The second soldering part 562_17 may be in contact with the second lead line 310*c*_16, the filling layer UF_16, and the second electrode 513.

The electrodes 512 and 513 of the sound generator 510 are not in physical contact with but are electrically connected to the lead lines 310*b*_16 and 310*c*_16 through the first soldering part 561_17 and the second soldering part 562_17 and thus the driving voltages of the sound driving circuit 340 may be applied thereto.

Figure 18:
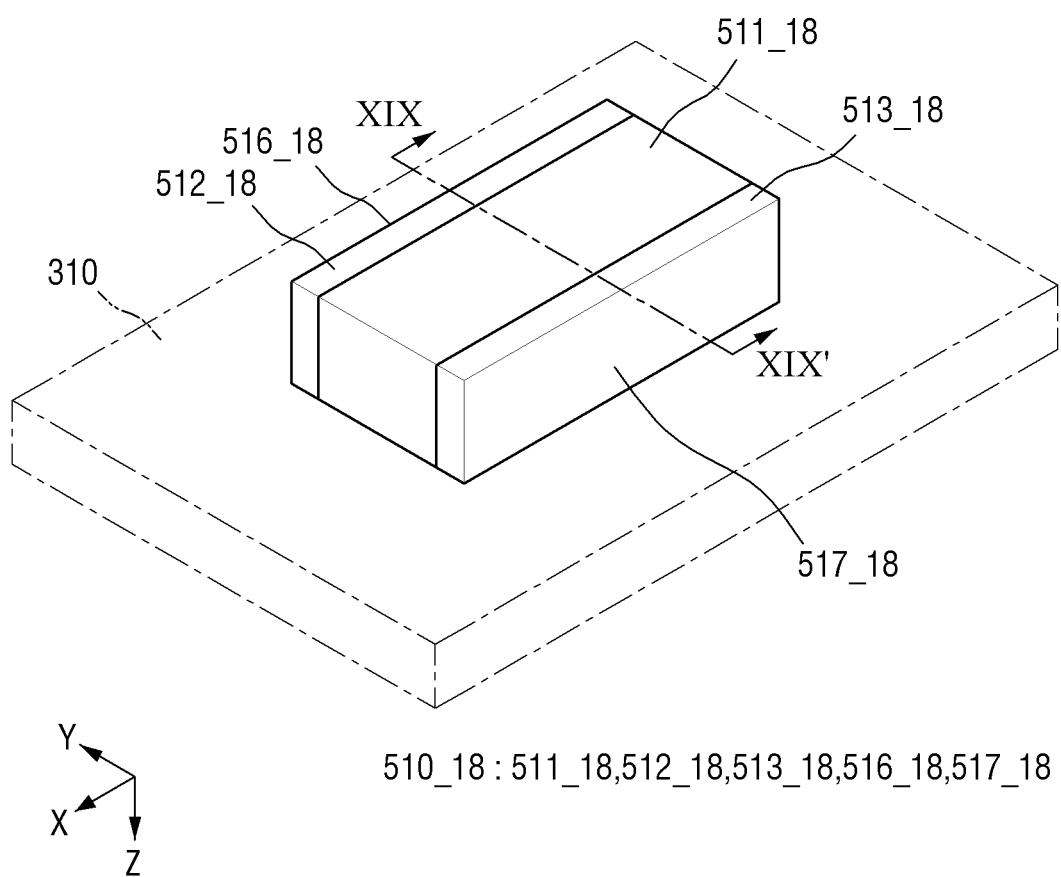
FIG. 18 is a perspective view of a further exemplary embodiment of a sound generator disposed on the display circuit board of area A of FIG. 3.
Figure 19:
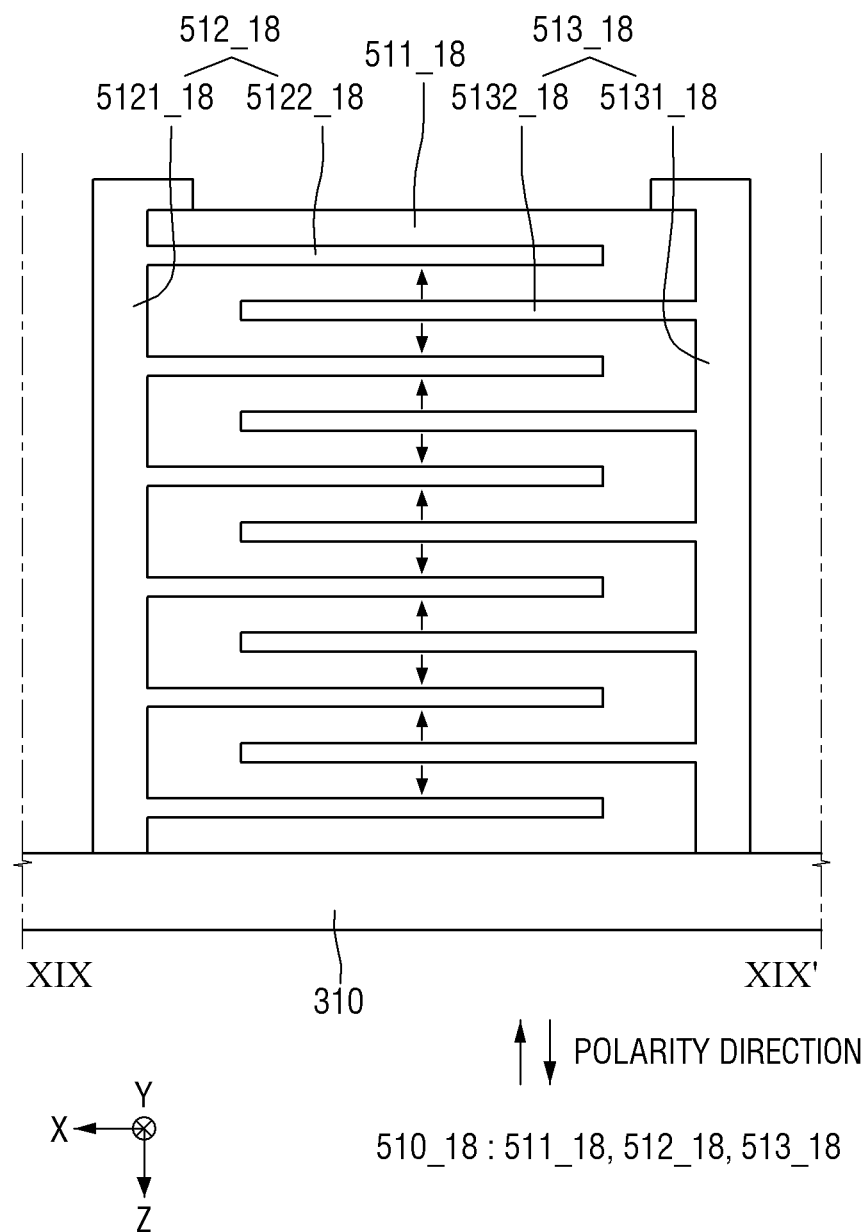
FIG. 19 is a cross-sectional view taken along line XIX-XIX' of FIG. 18.
Figure 20:
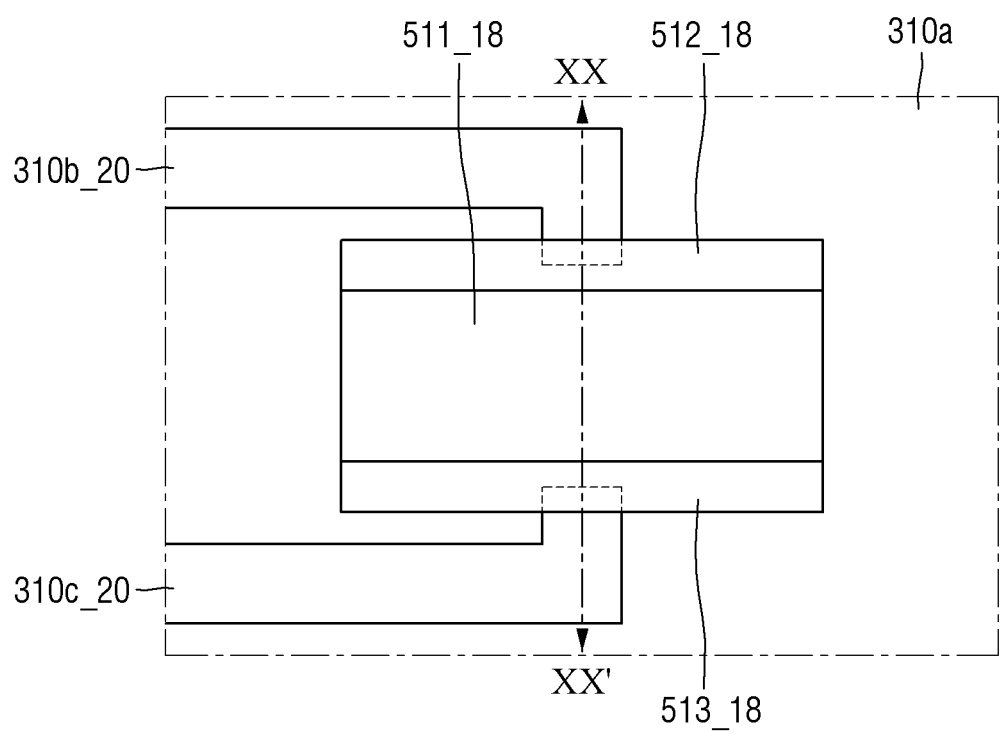
FIG. 20 is a bottom, plan view of another exemplary embodiment of the sound generator, lead lines, and base layer of FIG. 18.
Figure 21:
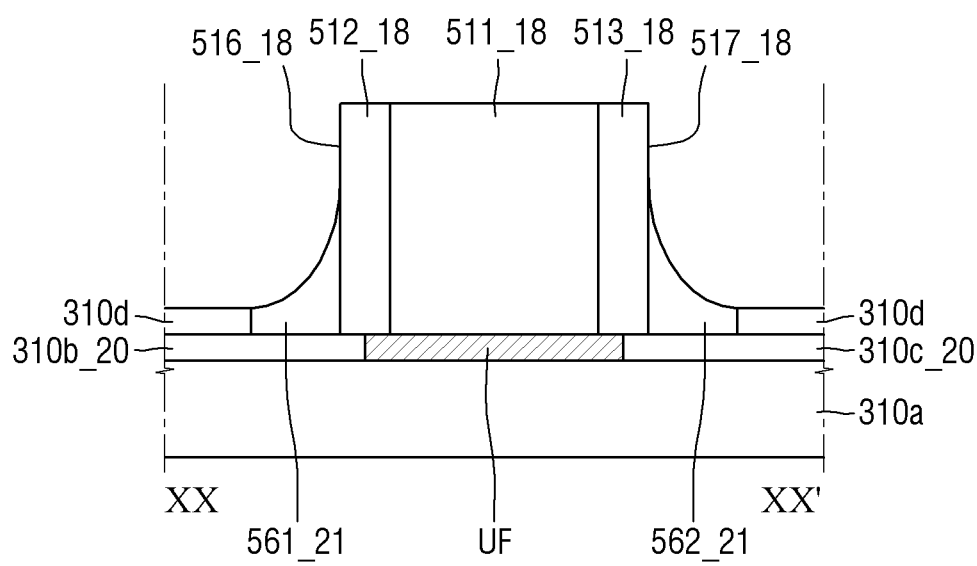
FIG. 21 is a cross-sectional view taken along line XX-XX' of FIG. 20.

FIG. 18 is a perspective view of a further exemplary embodiment of a of a sound generator disposed on the display circuit board of area A of FIG. 3. FIG. 19 is a cross-sectional view taken along line XIX-XIX' of FIG. 18. FIG. 20 is a bottom, plan view of another exemplary embodiment of the sound generator, lead lines, and base layer of FIG. 18. FIG. 21 is a cross-sectional view taken along line XX-XX' of FIG. 20.

A sound generator 510_18 shown in FIGS. 18 to 21 is different from the sound generator 510 shown in FIG. 8 in that a first electrode 512_18 and a second electrode 513_18 of the sound generator 510_18 form, respectively, one side surface 516_18 and the other side surface 517_18 forming the long sides of the sound generator 510_18 in the first direction (the X-axis direction) when viewed from the top down. The embodiment of FIGS. 18 to 21 will be described focusing on the differences from the embodiment shown in FIG. 8.

For clarity, FIG. 18 does not show certain elements referenced by and shown in FIG. 20, as discussed below. Moreover, in FIG. 20, certain elements, such as the resist layer 310*d* and the first and second soldering parts 561_21 and 562_21 are not shown in order to reveal the lead lines 310*b*_20 and 310*c*_20. Referring to FIGS. 18 to 21, the first electrode 512_18 of the sound generator 510_18 may be disposed at one end of the long sides of the sound generator 510_18 in the first direction (the X-axis direction) to form one side surface 516_18 of the sound generator 510_18 when viewed from the top down. As shown in FIG. 18, the first electrode 512_18 may forma third side surface 516_18 of the sound generator 510. The first electrode 512_18 may extend in the first direction (the X-axis direction) from the upper side of the sound generator 510 when viewed from the top down. Referring to FIG. 18, some elements, such as lead lines are not depicted, and the lead lines 310*b*-*c*_20 are visible in FIG. 20 because certain elements are not illustrated.

The second electrode 513_18 of the sound generator 510_18 may form the other side surface of the sound generator 510_18. The other side surface of the sound generator 510_18 where the second electrode 513_18 is disposed may be a surface that faces the one side surface 516_18 where the first electrode 512_18 is disposed. The second electrode 513_18 may be disposed at the other end of the long sides of the sound generator 510_18 in the first direction (the X-axial direction) to form a fourth side surface 517_18 of the sound generator 510_18. The second electrode 513_18 may extend in the second direction (the X-axis direction) from the lower side of the sound generator 510 when viewed from the top down. As shown in FIG. 18, the third side surface 516_18 of the sound generator 510 may be the back side surface, and the fourth side surface 517_18 may be the front side surface 517_18.

A first external electrode 5121_18 of the first electrode 512_18 may be disposed on a lower side surface of a vibration layer 511_18. First internal electrodes 5122_18 may be branched from the first external electrode 5121_18 in the opposite direction to the second direction (the Y-axis direction). The first internal electrodes 5122_18 may be arranged to be generally parallel with one another in the horizontal direction (the X-axis direction or the Y-axis direction).

A second external electrode 5131_18 of the second electrode 513_18 may be disposed on a lower side surface of the vibration layer 511_18. The second internal electrodes 5132_18 may be branched from the second external electrode 5131_18 in the second direction (the Y-axis direction). The second internal electrodes 5132_18 may be arranged to be generally parallel with one another in the horizontal direction (the X-axis direction or the Y-axis direction).

A first lead line 310*b*_20 electrically connected to the first electrode 512_18 by a first soldering part 561_21 and a second lead line 310*c*_20 electrically connected to the second electrode 513_18 by a second soldering part 562_21 may be spaced apart from each other in the second direction (the Y-axis direction).

The first soldering part 561_21 may extend from one surface of the first lead line 310*b*_20 to the sound generator 510_18 and thus may be disposed on the third side surface 516_18 of the sound generator 510_18. Also, the second soldering part 562_21 may extend from one surface of the second lead line 310*c*_20 to the sound generator 510_18 and thus may be disposed on the fourth side surface 516_17 of the sound generator 510_18.

Figure 22:
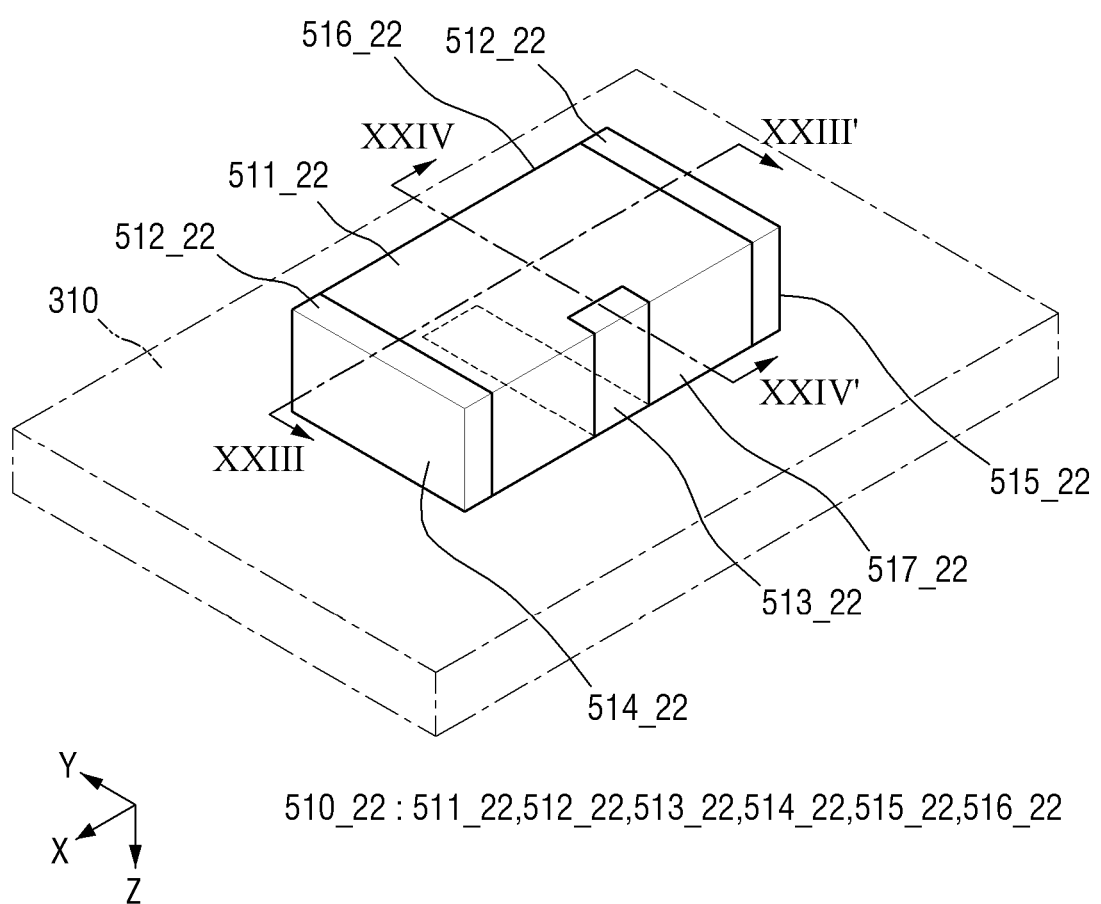
FIG. 22 is a perspective view of still another exemplary embodiment of the sound generator disposed on the display circuit board of area A of FIG. 3.
Figure 23:
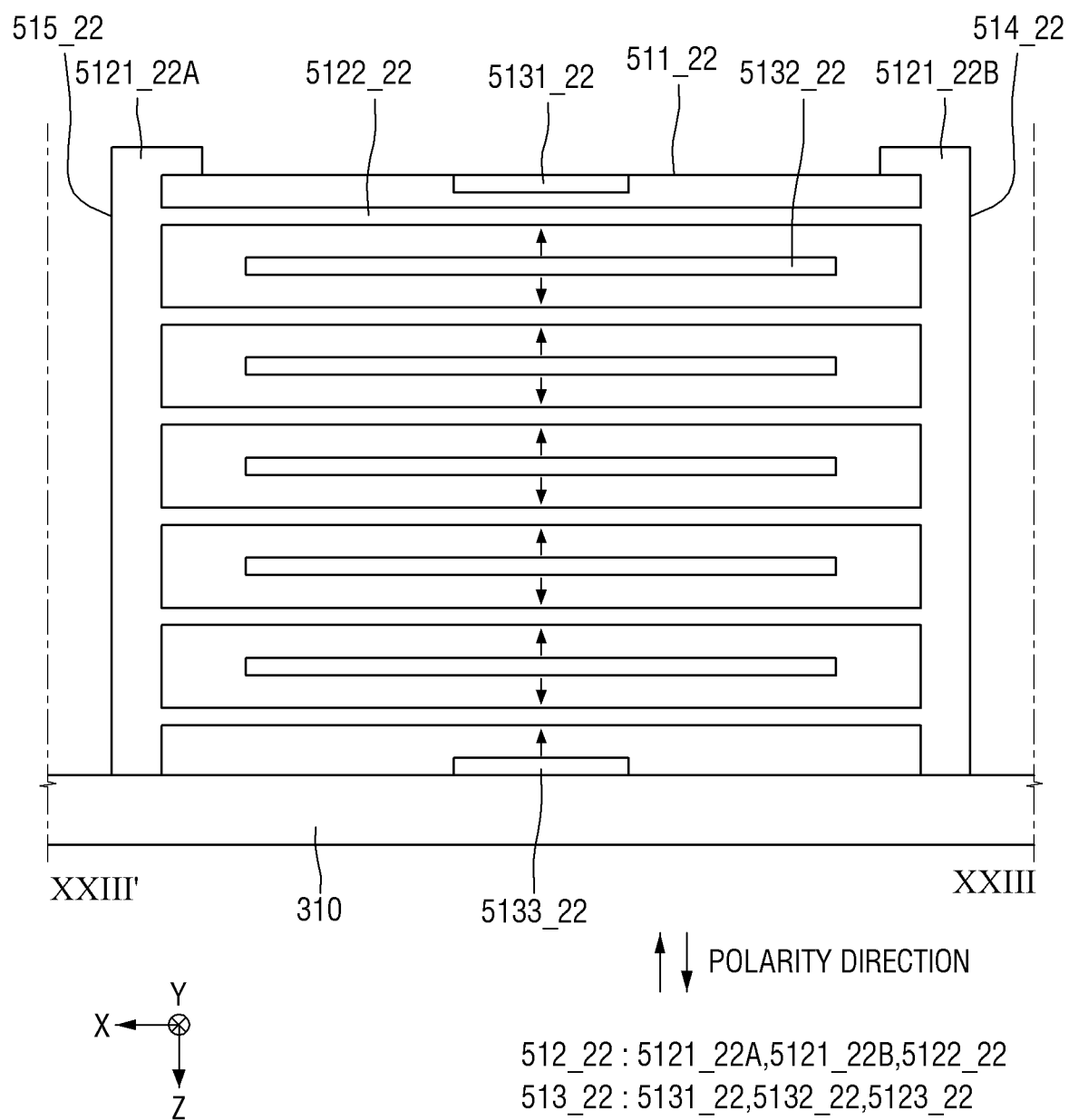
FIG. 23 is a cross-sectional view taken along line XXIII-XXIII' of FIG. 22.
Figure 24:
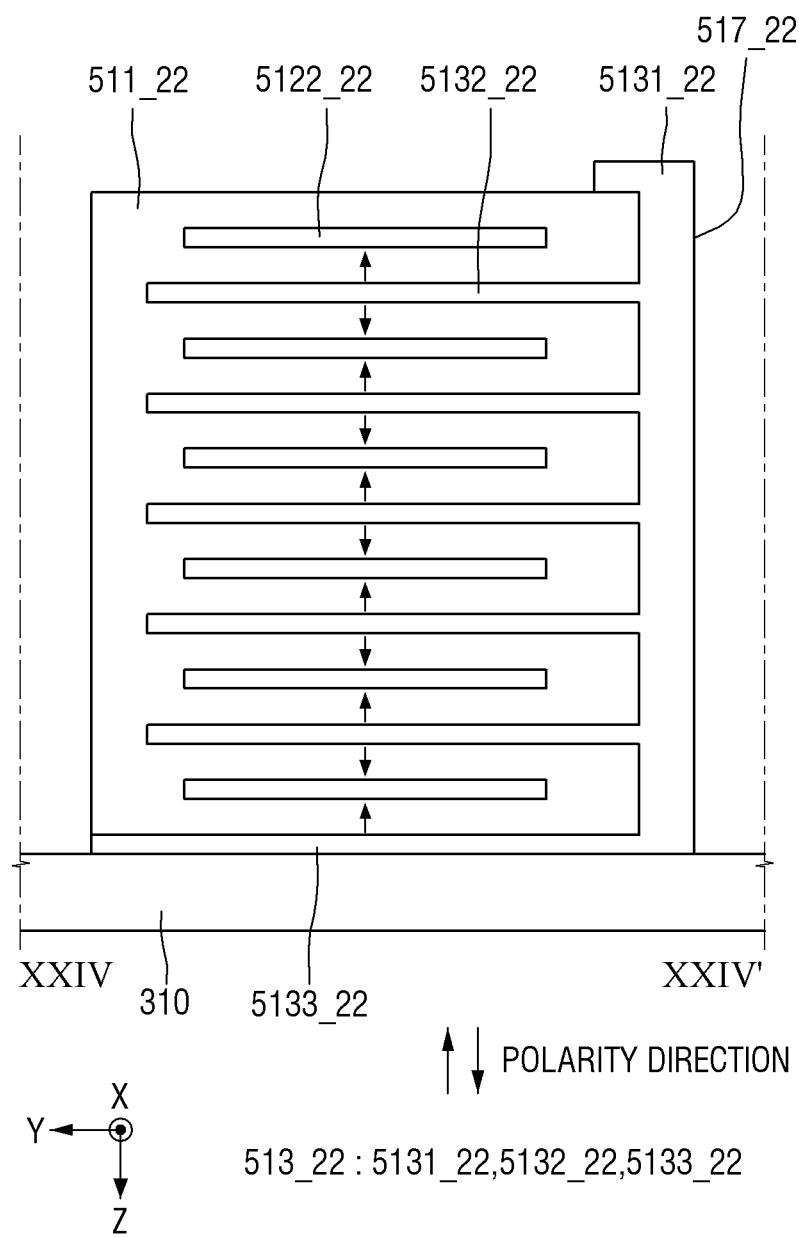
FIG. 24 is a cross-sectional view taken along line XXIV-XXIV' of FIG. 22.

FIG. 22 is a perspective view of still another exemplary embodiment of the sound generator disposed on the display circuit board of area A of FIG. 3. FIG. 23 is a cross-sectional view taken along line XXIII-XXIII' of FIG. 22. FIG. 24 is a cross-sectional view taken along line XXIV-XXIV' of FIG. 22.

Figure 26:
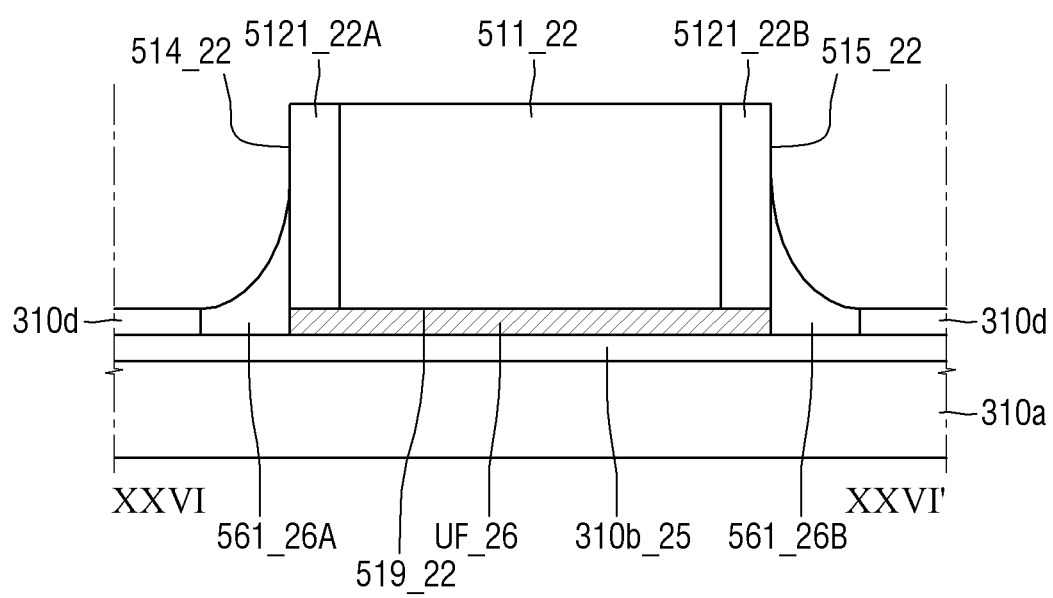
FIG. 26 is a cross-sectional view taken along line XXVI-XXVI' of FIG. 25.
Figure 27:
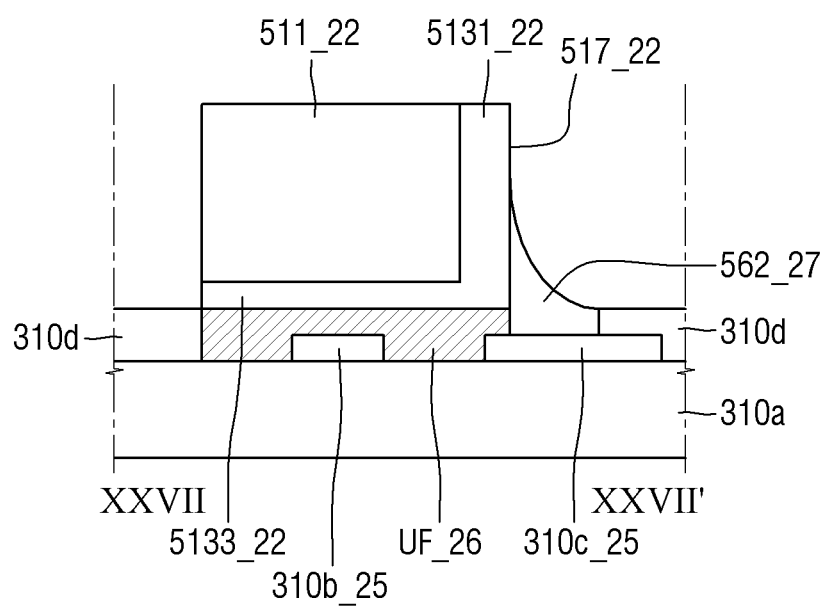
FIG. 27 is a cross-sectional view taken along line XXVII-XXVII' of FIG. 25.

For clarity, FIG. 22 does not show certain elements referenced by and shown in FIG. 25, as discussed below. Moreover, in FIG. 25, certain elements, such as the resist layer 310*d* and the first and second soldering parts 561_26A and 561_26B in FIG. 26 and the second soldering part 562_27 in FIG. 27 are not shown in order to reveal the lead lines 310*b*_25 and 310*c*_25. A sound generator 510_22 shown in FIGS. 22 to 24 is different from the sound generator 510 shown in FIG. 8 in that the electrodes 512_22 and 513_22 of the sound generator 510_22 are disposed on least three of a plurality of side surfaces of the sound generator 510_22. The embodiment of FIGS. 22 to 24 will be described focusing on the differences from the embodiment shown in FIG. 8. Some elements, such as lead lines are omitted from FIG. 22 but the lead lines 310*b*-*c*_25 are visible in FIG. 25.

Referring to FIGS. 22 to 24, the first electrode 512_22 of the sound generator 510_22 may be disposed at both ends of the short sides of the sound generator 510_18 in the second direction (the Y-axis direction) to form both side surfaces 514_22 and 515_22 of the sound generator 510_22 when viewed from the bottom up. That is, the first electrode 512_22 of the sound generator 510_22 may form a second side surface 515_22 facing a first side surface 514_22 of the sound generator 510_22. The first electrode 512_22 may extend from the right and left of the sound generator 510_22 in the second direction (the Y-axis direction) when viewed from the top down.

The first electrode 512_22 may include a first-A electrode 5121_22A, a first-B external electrode 5121_22B, and first internal electrodes 5122_22. As shown in FIG. 23, the first-A external electrode 5121_22A may be disposed on the first side surface 514_22 of the sound generator 510_22, and the first-B external electrode 5121_22B may be disposed on the second side surface 515_22 of the sound generator 510_22.

In an exemplary embodiment, the first-A external electrode 5121_22A and the first-B external electrode 5121_22B may be exposed without being covered by the vibration layer 511_22 and may be external electrodes of the sound generator 510_22.

The first internal electrodes 5122_22 may be branched from the first-A external electrode 5121_22A and the first-B external electrode 5121_22B in the first direction (the X-axis direction). The first internal electrodes 5122_22 may be covered with the vibration layer 511_22 and thus may not be exposed to the outside of the sound generator 510_22.

The first internal electrodes 5122_22 may connect the first-A external electrode 5121_22A and the first-B external electrode 5121_22B which are spaced apart from each other. Accordingly, even when a first driving voltage is applied to at least one of the first-A external electrode 5121_22A and the first-B external electrode 5121_22B, the first driving voltage may be applied to the entirety of the first electrode 512_22.

The second electrode 513_22 of the sound generator 510_22 may be disposed on a third side surface 516_22 of the sound generator 510_22 other than the first side surface 514_22 and the second side surface 515_22. The second electrode 513_22 may be disposed at one end forming the long sides 516_22 or 517_22 of the sound generator 510_22 in the first direction (the X-axis direction) when viewed from the top down. In an exemplary embodiment, the second electrode 513_22 of the sound generator 510_22 may be disposed below the substrate 310 when viewed from the bottom up. As shown in FIG. 22, the second electrode 513_22 of the sound generator 510_22 may form a portion of a fourth side surface 517_22.

The second electrode 513_22 may include a second external electrode 5131_22, second internal electrodes 5132_22, and a second upper electrode 5133_22.

As shown in FIG. 24, the second external electrode 5131_22 may be disposed on the fourth side surface 517_22 of the sound generator 510_22. The second external electrode 5131_22 may be a second external electrode 5131_22 exposed to the outside of the sound generator 510_22.

The second internal electrodes 5132_22 may be branched from the second external electrode 5131_22 in the second direction (the Y-axis direction). The second internal electrodes 5132_22 may be covered with the vibration layer 511_22 and thus may not be exposed to the outside of the sound generator 510_22. Accordingly, the second internal electrodes 5132_22 may be first internal electrodes 5132_22.

The second upper electrode 5133_22 may be one of the second internal electrodes branched from the second external electrode 5131_22. The second upper electrode 5133_22 may form a portion of the upper surface of the sound generator 510_22 among the second internal electrodes 5132_22 branched from the second external electrode 5131_22. The second upper electrode 5133_22 may form a second external electrode of the sound generator 510_22.

Figure 25:
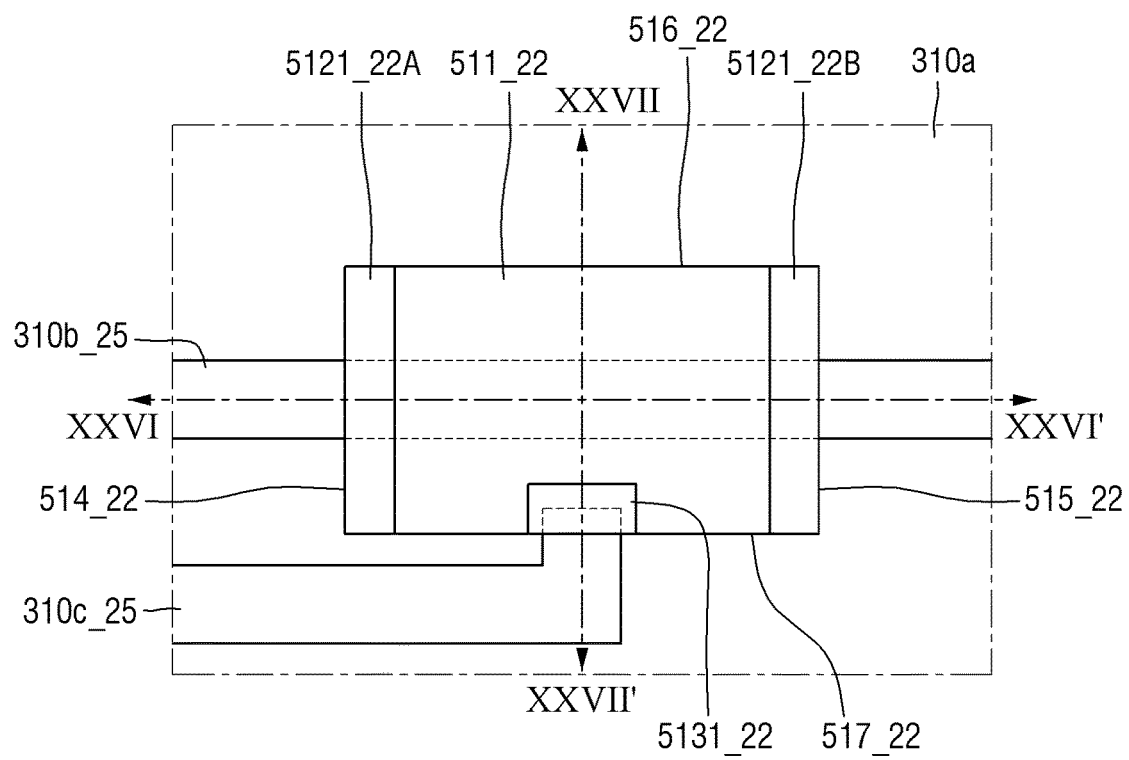
FIG. 25 is a bottom, plan view of another exemplary embodiment of the sound generator, lead lines, and base layer of FIG. 22.
Figure 25:
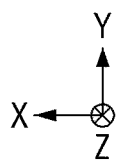

FIG. 25 is a bottom, plan view of another exemplary embodiment of the sound generator, lead lines, and base layer of FIG. 22. FIG. 26 is a cross-sectional view taken along line XXVI-XXVI' of FIG. 25. FIG. 27 is a cross-sectional view taken along line XXVII-XXVII' of FIG. 25.

Referring to FIGS. 25 to 27, a first lead line 310b_25 may extend in the first direction (the X-axis direction), which is a direction forming the long side of the sound generator 510_22 on the base layer 310a. The first lead line 310b_25 may be overlapped with the first-A external electrode 5121_22A, the first-B external electrode 5121_22B, and the vibration layer 511_22 of the sound generator 510_22 in the thickness direction of the display circuit board 310. A second lead line 310c_25 may be at least partially overlapped with the second external electrode 5131_22 in the thickness direction of the circuit board 310.

A filling layer UF_26 for filling a space between the sound generator 510_22 and the base layer 310a may be disposed. The filling layer UF_26 may be in contact with at least one of an upper surface 519_22 of the sound generator 510_22, the lower surface of the base layer 310a exposed by the lead lines 310b_25 and 310c_25, and the lead lines 310b_25 and 310c_25.

In the drawings, the filling layer UF_26 is illustrated as being substantially entirely disposed on only the upper surface 519_22 of the sound generator 510_22. However, exemplary embodiments are not limited thereto, and the filling layer UF_26 may be disposed on and extend up to a side surface 514_22, 515_22, 516_22, or 517_22 of the sound generator 510_22. Accordingly, it is possible to increase the fastening force by which the sound generator 510_22 is attached to the display circuit board 310.

The first lead line 310b_25 may be exposed by the sound generator 510_22 and the solder resist layer 310d in the thickness direction of the display circuit board 310. A first-A soldering part 561_26A may be disposed on the first lead line 310b_25 exposed to the first side of the sound generator 510_22. A first-B soldering part 561_26B may be disposed on the first lead line 310b_25 exposed to the first side of the sound generator 510_22. The first-A soldering part 561_26A and the first-B soldering part 561_26B may extend toward the sound generator 510_22 and thus may be in contact with the side surface of the first-A external electrode 5121_22A and the first-B external electrode 5121_22B.

The first driving voltage of the sound driving circuit 340 may be applied to the first electrode 512_22 of the sound generator 510_22 through the first lead line 310b_25, the first-A soldering part 561_26A, and the first-B soldering part 561_26B.

The second lead line 310c_25 may be exposed by the sound generator 510_22 and the solder resist layer 310d in the thickness direction of the display circuit board 310. A second soldering part 562_27 may be disposed on the second lead line 310c_25 exposed to the third side of the sound generator 510_22. The second soldering part 562_27 may extend toward the sound generator 510_22 and come into contact with the side surface of the second external electrode 5131_22.

The second driving voltage of the sound driving circuit 340 may be applied to the second electrode 513_22 of the sound generator 510_22 through the second lead line 310c_25 and the second soldering part 562_27.

In this embodiment, the soldering parts 561_26A, 561_26B, and 562_27 for electrically connecting the lead lines 310b_25 and 310c_25 to the electrodes 512_22 and 513_22 of the sound generator may be disposed on at least three of a plurality of side surfaces 514_22, 515_22, 516_22, and 517_22 of the sound generator 510_22.

Some of the advantages that may be achieved by exemplary implementations of the invention include it is increasing the fastening force for attaching the sound generator to lead lines by forming multiple soldering parts. It is also possible to more evenly distribute stress applied to the soldering parts due to external impact.

In some exemplary embodiments, the sound generator for vibrating a display panel in order to output sounds may be disposed on one surface of a display circuit board. Thus, the sounds may be output by using the display panel as a vibration surface by means of the sound generator that is not exposed to the outside. Therefore, a speaker on the front surface of the display device for outputting sound, such as another party's voice, may be obviated, and thus the transmission part of the cover window may be widened. Accordingly, it is possible to increase the area where images are displayed by the display panel.

In some exemplary embodiments, the sound generator may form external electrodes to which a driving voltage is to be applied on an external surface forming the sound generator and may electrically connect an external electrode of the sound generator to the lead lines of the display circuit board by a soldering part. In this case, the sound generator may be formed integrally with the display circuit board while the display circuit board is being manufactured. Accordingly, since a process or apparatus required to separately attach the sound generator to the lower surface of the lower panel cover is obviated, it is possible to reduce manufacturing costs. Also, there is no need to separately provide a space to which the sound generator is attached in the lower panel cover.

According to some exemplary embodiments, a filling layer may be further disposed in a space between the sound generator and the circuit board. In this case, vibration of the sound generator may be delivered through the front surface of the filling layer. Therefore, by delivering the vibration of the sound generator to the display circuit board through the filling layer in addition to the soldering parts, it is possible to increase the sound pressure level due to the enlargement of the vibration surface.

Also, by using such a filling layer, it is possible to distribute stress concentration caused by the soldering parts disposed on the side surface of the sound generator into the filling layer. Accordingly, when the display device is dropped and/or subject to external force, it is possible to reduce the stress delivered to the sound generator. Further, it is also possible to increase the fastening force between the sound generator and the circuit board.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A circuit board for a display device, the circuit board comprising:
   a first layer;
   a first lead line disposed on the first layer;
   a second lead line disposed on the first layer and spaced apart from the first lead line to externally expose the first layer in a thickness direction;
   a second solder to electrically communicate the second lead line and the second electrode; and
   a sound generator disposed on the first layer externally exposed by the first and second lead lines, and including:
     a first electrode to receive a first driving voltage;
     a second electrode to receive a second driving voltage; and
     a second layer disposed between the first electrode and the second electrode to contract or expand according to the first driving voltage and the second driving voltage; and
   a first solder to electrically communicate the first lead line and the first electrode,
   wherein the first lead line and the second lead line are disposed on a same surface of the first layer and are coplanar with each other.

2. The circuit board of claim 1, wherein:
   the first electrode is disposed on the first lead line, and the second electrode is disposed on the second lead line.

3. The circuit board of claim 2, wherein:
   the first solder is in contact with the first electrode and the first lead line, and
   the second solder is in contact with the second electrode and the second lead line.

4. The circuit board of claim 1, wherein,
   the sound generator comprises a piezoelectric element and is disposed on a portion of the first layer exposed by the first lead line and the second lead line,
   the first lead line and the first electrode do not overlap each other in the thickness direction of the sound generator, and
   the second lead line and the second electrode do not overlap each other in the thickness direction of the sound generator.

5. The circuit board of claim 4, further comprising a filling layer disposed between the sound generator and a portion of the first layer exposed by the first lead line and the second lead line, in which the filling layer is disposed directly between the first and second lead lines on a third layer provided between the first and second layers, in which the filling layer has a same thickness as the first and second lead lines.

6. The circuit board of claim 5, wherein,
   the first solder comprising a first soldering part is in contact with the first electrode, the first lead line, and the filling layer, and
   the second solder comprising a second soldering part is in contact with the second electrode, the second lead line, and the filling layer.

7. The circuit board of claim 1, wherein the first layer comprises a base layer, the second layer comprises a vibration layer, and the first electrode comprises:
   a first external electrode disposed at a side surface and a top surface of the sound generator; and
   first internal electrodes branched from the first external electrode.

8. The circuit board of claim 7, wherein the first solder is in contact with the first external electrode.

9. The circuit board of claim 7, wherein the second electrode comprises:
   a second external electrode disposed on the top surface and the other side surface opposite to the one side surface of the sound generator; and
   second internal electrodes branched from the second external electrode.

10. The circuit board of claim 9, further comprising:
    a second lead line disposed on the first layer and spaced apart from the first lead line; and
    a second solder to electrically communicate the second lead line and the second electrode.

11. The circuit board of claim 10, wherein,
    the first solder is electrically communicated with the first external electrode, and
    the second solder is electrically communicated with the second external electrode.

12. The circuit board of claim 1, wherein the first electrode comprises:
    a first external electrode disposed on a first side surface of the sound generator;
    a second external electrode disposed on a second side surface opposite to the first side surface of the sound generator; and
    first internal electrodes branched from the first external electrode and the second external electrode.

13. The circuit board of claim 12, wherein the second electrode comprises:
    a second external electrode disposed on a third side surface, which is a surface other than the first side surface and the second side surface of the sound generator; and
    second internal electrodes branched from the second external electrode.

14. A circuit board for a display device, the circuit board comprising:
    a first layer;

first and second lead lines disposed on the first layer to externally expose the first layer in a thickness direction for connecting thereto;

a sound generator disposed on the first layer externally exposed by the first and second lead lines to vibrate and output sounds according to sound driving voltages; and a sound generator disposed on the first layer exposed by the lead lines to vibrate and output sounds according to sound driving voltages; and a second layer disposed between the first layer and the sound generator to transmit vibrations from the sound generator to the first layer.

15. The circuit board of claim 14, wherein the first layer comprises a base layer and the second layer comprises a filling layer containing at least one of an epoxy resin, an ethyl cyanoacrylic acid, a methyl methacrylate, and a trifluoroborane, in which the filling layer is disposed directly between the first and second lead lines on a third layer provided between the first and second layers, in which the filling layer has a same thickness as the first and second lead lines.

16. The circuit board of claim 14, wherein the second layer is coupled with at least one of the lead lines.

17. The circuit board of claim 14, wherein the sound generator comprises:

a first electrode to receive a first one of the sound driving voltages;

a second electrode to receive a second one of the sound driving voltages; and a vibration layer including a piezoelectric element disposed between the first electrode and the second electrode to contract and expand according to a first driving voltage and a second driving voltage.

* * * * *